(12) United States Patent
Westerman et al.

(10) Patent No.: US 8,445,793 B2
(45) Date of Patent: May 21, 2013

(54) SELECTIVE INPUT SIGNAL REJECTION AND MODIFICATION

(75) Inventors: Wayne Carl Westerman, Burlingame, CA (US); Christopher Tenzin Mullens, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/251,013

(22) Filed: Sep. 30, 2011

(65) Prior Publication Data
US 2012/0019468 A1   Jan. 26, 2012

Related U.S. Application Data

(63) Continuation of application No. 12/242,794, filed on Dec. 8, 2008, now Pat. No. 8,294,047.

(51) Int. Cl.
*G06F 3/41* (2006.01)
(52) U.S. Cl.
USPC ............ 178/18.03; 178/18.01; 178/18.02
(58) Field of Classification Search
USPC ............ 345/156, 173–184; 178/18.01–18.09, 178/19.01–19.07, 20.01–20.04; 338/68
See application file for complete search history.

(56) References Cited

U.S. PATENT DOCUMENTS

| | | | |
|---|---|---|---|
| 4,346,376 A | 8/1982 | Mallos | |
| 4,658,690 A | 4/1987 | Aitken et al. | |
| 5,434,757 A | 7/1995 | Kashiwagi | |
| 5,481,278 A | 1/1996 | Shigematsu et al. | |
| 5,483,261 A | 1/1996 | Yasutake | |
| 5,488,204 A | 1/1996 | Mead et al. | |
| 5,495,077 A | 2/1996 | Miller et al. | |
| 5,541,372 A * | 7/1996 | Baller et al. | 178/18.01 |
| 5,563,632 A | 10/1996 | Roberts | |
| 5,591,945 A | 1/1997 | Kent | |
| 5,764,218 A | 6/1998 | Della Bona et al. | |
| 5,767,457 A * | 6/1998 | Gerpheide et al. | 178/18.03 |
| 5,821,922 A | 10/1998 | Sellers | |
| 5,825,352 A | 10/1998 | Bisset et al. | |
| 5,835,079 A | 11/1998 | Shieh | |

(Continued)

FOREIGN PATENT DOCUMENTS

| | | |
|---|---|---|
| EP | 1 691 263 A1 | 8/2006 |
| GB | 2 344 894 A | 6/2000 |

(Continued)

OTHER PUBLICATIONS

Non-Final Office Action mailed Oct. 12, 2011, for U.S. Appl. No. 12/242,772, filed Sep. 30, 2008, 17 pages.

(Continued)

*Primary Examiner* — Prabodh M Dharia
(74) *Attorney, Agent, or Firm* — Morrison & Foerster LLP

(57) ABSTRACT

This invention is related to user input devices that accept complex user input including a combination of touch and push (or pick) input. The invention provides for selective ignoring or rejection of input received from such devices in order to avoid interpreting unintentional user actions as commands. Furthermore, some input signals can be modified. The selective rejection or modification can be performed by the user interface device itself or by a computing device that includes or is attached to the user interface device. The selective rejection or modification may be performed by a module that processes input signals, performs the necessary rejections and modifications and sends revised input signals to higher level modules.

30 Claims, 13 Drawing Sheets

U.S. PATENT DOCUMENTS

| | | | |
|---|---|---|---|
| 5,856,822 A | 1/1999 | Du et al. | |
| 5,864,334 A | 1/1999 | Sellers | |
| 5,880,411 A | 3/1999 | Gillespie et al. | |
| 5,943,052 A | 8/1999 | Allen et al. | |
| 5,963,671 A | 10/1999 | Comerford et al. | |
| 5,996,080 A * | 11/1999 | Silva et al. | 713/320 |
| 6,118,435 A | 9/2000 | Fujita et al. | |
| 6,154,210 A | 11/2000 | Anderson | |
| 6,188,391 B1 | 2/2001 | Seely et al. | |
| 6,216,988 B1 | 4/2001 | Hsu et al. | |
| 6,243,080 B1 | 6/2001 | Molne | |
| 6,246,395 B1 | 6/2001 | Goyins et al. | |
| 6,266,050 B1 | 7/2001 | Oh et al. | |
| 6,310,610 B1 | 10/2001 | Beaton et al. | |
| 6,323,846 B1 | 11/2001 | Westerman et al. | |
| 6,336,614 B1 | 1/2002 | Kwitek | |
| 6,337,678 B1 | 1/2002 | Fish | |
| 6,369,803 B2 | 4/2002 | Brisebois et al. | |
| 6,459,424 B1 | 10/2002 | Resman | |
| 6,492,979 B1 | 12/2002 | Kent et al. | |
| 6,504,530 B1 | 1/2003 | Wilson et al. | |
| 6,610,936 B2 | 8/2003 | Gillespie et al. | |
| 6,611,253 B1 | 8/2003 | Cohen | |
| 6,654,001 B1 | 11/2003 | Su | |
| 6,690,387 B2 | 2/2004 | Zimmerman et al. | |
| 6,747,636 B2 | 6/2004 | Martin | |
| 6,756,971 B1 | 6/2004 | Ramey et al. | |
| 6,819,312 B2 | 11/2004 | Fish | |
| 6,943,705 B1 | 9/2005 | Bolender et al. | |
| 6,943,779 B2 | 9/2005 | Satoh | |
| 6,958,749 B1 | 10/2005 | Matsushita et al. | |
| 7,015,894 B2 | 3/2006 | Morohoshi | |
| 7,038,659 B2 | 5/2006 | Rajkowski | |
| 7,046,230 B2 | 5/2006 | Zadesky et al. | |
| 7,148,882 B2 * | 12/2006 | Kamrath et al. | 345/174 |
| 7,176,902 B2 * | 2/2007 | Peterson et al. | 345/173 |
| 7,184,064 B2 | 2/2007 | Zimmerman et al. | |
| 7,277,087 B2 * | 10/2007 | Hill et al. | 345/173 |
| 7,289,111 B2 | 10/2007 | Asbill | |
| 7,345,670 B2 * | 3/2008 | Armstrong | 345/156 |
| 7,499,040 B2 | 3/2009 | Zadesky et al. | |
| 7,561,146 B1 | 7/2009 | Hotelling | |
| 7,633,076 B2 | 12/2009 | Huppi et al. | |
| 7,639,233 B2 * | 12/2009 | Marks | 345/156 |
| 7,663,607 B2 | 2/2010 | Hotelling et al. | |
| 7,746,325 B2 * | 6/2010 | Roberts | 345/173 |
| 7,834,855 B2 | 11/2010 | Hotelling et al. | |
| 7,852,199 B2 * | 12/2010 | Desai et al. | 340/426.1 |
| 7,911,455 B2 * | 3/2011 | Nishikawa et al. | 345/173 |
| 7,986,307 B2 * | 7/2011 | Zotov et al. | 345/173 |
| 8,072,439 B2 | 12/2011 | Hillis et al. | |
| 8,098,233 B2 | 1/2012 | Hotelling et al. | |
| 8,253,698 B2 | 8/2012 | Chen et al. | |
| 8,294,047 B2 | 10/2012 | Westerman et al. | |
| 2002/0080123 A1 | 6/2002 | Kennedy et al. | |
| 2002/0158838 A1 | 10/2002 | Smith et al. | |
| 2003/0095095 A1 | 5/2003 | Pihlaja | |
| 2003/0206162 A1 * | 11/2003 | Roberts | 345/173 |
| 2004/0104894 A1 | 6/2004 | Tsukada et al. | |
| 2004/0108994 A1 | 6/2004 | Kato | |
| 2004/0119744 A1 | 6/2004 | Chan | |
| 2004/0227736 A1 * | 11/2004 | Kamrath et al. | 345/173 |
| 2004/0233624 A1 | 11/2004 | Aisenberg | |
| 2005/0052425 A1 | 3/2005 | Zadesky et al. | |
| 2005/0078093 A1 * | 4/2005 | Peterson et al. | 345/173 |
| 2005/0146512 A1 * | 7/2005 | Hill et al. | 345/173 |
| 2005/0162406 A1 | 7/2005 | Ono et al. | |
| 2006/0026521 A1 | 2/2006 | Hotelling et al. | |
| 2006/0033701 A1 | 2/2006 | Wilson | |
| 2006/0038796 A1 | 2/2006 | Hinckley et al. | |
| 2006/0052885 A1 | 3/2006 | Kong | |
| 2006/0066588 A1 * | 3/2006 | Lyon et al. | 345/173 |
| 2006/0109252 A1 | 5/2006 | Kolmykov-Zotov et al. | |
| 2006/0197753 A1 * | 9/2006 | Hotelling | 345/173 |
| 2006/0228149 A1 | 10/2006 | Harley | |
| 2006/0238522 A1 | 10/2006 | Westerman et al. | |
| 2006/0284836 A1 * | 12/2006 | Philipp | 345/156 |
| 2007/0075965 A1 * | 4/2007 | Huppi et al. | 345/156 |
| 2007/0152976 A1 * | 7/2007 | Townsend et al. | 345/173 |
| 2007/0152983 A1 | 7/2007 | McKillop et al. | |
| 2007/0182722 A1 | 8/2007 | Hotelling et al. | |
| 2007/0247429 A1 * | 10/2007 | Westerman | 345/168 |
| 2008/0012835 A1 | 1/2008 | Rimon et al. | |
| 2008/0012838 A1 | 1/2008 | Rimon | |
| 2008/0062144 A1 * | 3/2008 | Shahoian et al. | 345/173 |
| 2008/0136788 A1 * | 6/2008 | Nishikawa et al. | 345/173 |
| 2008/0136792 A1 * | 6/2008 | Peng et al. | 345/174 |
| 2008/0158145 A1 | 7/2008 | Westerman | |
| 2008/0158172 A1 | 7/2008 | Hotelling et al. | |
| 2008/0158181 A1 | 7/2008 | Hamblin et al. | |
| 2008/0158185 A1 | 7/2008 | Westerman | |
| 2008/0196945 A1 | 8/2008 | Konstas | |
| 2008/0202824 A1 | 8/2008 | Philipp et al. | |
| 2009/0101417 A1 | 4/2009 | Suzuki et al. | |
| 2009/0174679 A1 | 7/2009 | Westerman | |
| 2009/0244092 A1 | 10/2009 | Hotelling | |
| 2009/0284495 A1 | 11/2009 | Geaghan et al. | |
| 2009/0322351 A1 | 12/2009 | McLeod | |
| 2010/0099394 A1 | 4/2010 | Hainzl | |
| 2010/0139990 A1 | 6/2010 | Westerman et al. | |
| 2010/0141603 A1 | 6/2010 | Hotelling | |
| 2011/0163996 A1 | 7/2011 | Wassvik et al. | |
| 2012/0023459 A1 | 1/2012 | Westerman et al. | |
| 2012/0113009 A1 | 5/2012 | Hotelling | |

FOREIGN PATENT DOCUMENTS

| | | |
|---|---|---|
| GB | 2 402 105 A | 12/2004 |
| JP | 61-075981 A | 4/1986 |
| JP | 06-289969 A | 10/1994 |
| JP | 07-073278 A | 3/1995 |
| JP | 10-003349 A | 1/1998 |
| JP | 10-289061 A | 10/1998 |
| JP | 10-293644 A | 11/1998 |
| JP | 11-194883 A | 7/1999 |
| JP | 11-327788 A | 11/1999 |
| JP | 2000-039964 A | 2/2000 |
| JP | 2000-163031 A | 6/2000 |
| JP | 2000-194507 A | 7/2000 |
| JP | 2002-287889 A | 10/2002 |
| JP | 2002-287903 A | 10/2002 |
| JP | 2002-342033 A | 11/2002 |
| JP | 2003-173237 A | 6/2003 |
| JP | 2005-082806 A | 3/2005 |
| JP | 2007-242035 A | 9/2007 |
| JP | 2008-140182 A | 6/2008 |
| KR | 2004-0103125 A | 12/2004 |
| WO | WO-92/11623 A1 | 7/1992 |
| WO | WO-98/43202 A1 | 10/1998 |
| WO | WO-2004/025449 A2 | 3/2004 |
| WO | Wo-2004/025449 A3 | 3/2004 |
| WO | WO-2006/026183 A2 | 3/2006 |
| WO | WO-2006/026183 A3 | 3/2006 |
| WO | WO-2007/089766 A1 | 8/2007 |
| WO | WO-2009/088672 A2 | 7/2009 |
| WO | WO-2009/088672 A3 | 7/2009 |

OTHER PUBLICATIONS

European Search Report mailed Dec. 10, 2009, for EP Application No. 08022346.4, ten pages.

GB Search Report mailed Feb. 17, 2009, for GB Application No. 0823047.6, filed Dec. 18, 2008, two pages.

GB Combined Examination and Search Report mailed Nov. 25, 2010, for GB Application No. 1018237.6, filed Dec. 18, 2008, six pages.

International Search Report mailed Dec. 30, 2009, for PCT/US2008/087041, six pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Partial European Search Report mailed Sep. 18, 2009, for EP Application No. 08022346.4, six pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Nov. 9, 2011, for U.S. Appl. No. 13/250,955, filed Sep. 30, 2011, 32 pages.

Final Office Action mailed Feb. 24, 2012, for U.S. Appl. No. 13/250,955, filed Sep. 30, 2011, 29 pages.

Non-Final Office Action mailed Feb. 24, 2012, for U.S. Appl. No. 12/242,794, filed Dec. 8, 2008, seven pages.

European Search Report mailed Apr. 24, 2012, for EP Application No. 12160763.4, filed Dec. 23, 2008, nine pages.

Final Office Action mailed Apr. 12, 2012, for U.S. Appl. No. 12/242,772, filed Sep. 30, 2008, 24 pages.

Notice of Allowance mailed Jun. 26, 2012, for U.S. Appl. No. 12/242,794, filed Dec. 8, 2008, 10 pages.

Apple Computer, Inc., "Block Diagram and Buses" Apple Developer Connection, Aug. 3, 2004 downloaded from the Internet from http://developer.apple.com/documentation/Hardware/Developer_Notes/Macintosh_CPUs-G...(4 pages).

Apple Computer, Inc., "Powerbook G4" Technology Overview, Apr. 2004 (29 pages).

Communication for EP Patent Application No. 05788888.5-2224, mailed Sep. 4, 2007, 2 pages.

Communication for EP Patent Application No. 05788888.5-2224, mailed Sep. 1, 2008, 3 pages.

Final Office Action mailed Feb. 5, 2008, for U.S. Appl. No. 11/731,118, filed Mar. 30, 2007, nine pages.

Final Office Action mailed Feb. 20, 2008, for U.S. Appl. No. 10/927,577, filed Aug. 25, 2004, 11 pages.

Final Office Action mailed Mar. 26, 2008, for U.S. Appl. No. 10/927,575, filed Aug. 25, 2004, 25 pages.

Final Office Action mailed Mar. 4, 2009, for U.S. Appl. No. 11/731,118, filed Mar. 30, 2007, eight pages.

Final Office Action mailed Mar. 5, 2009, for U.S. Appl. No. 10/927,575, filed Aug. 25, 2004, 16 pages.

Final Office Action mailed Jan. 25, 2010, for U.S. Appl. No. 11/731,118, filed Mar. 30, 2007, nine pages.

Final Office Action mailed Mar. 2, 2010, for U.S. Appl. No. 10/927,575, filed Aug. 25, 2004, 16 pages.

Final Office Action mailed Sep. 16, 2010, for U.S. Appl. No. 12/479,741, filed Aug. 25, 2004, 11 pages.

Final Office Action mailed Jul. 27, 2012, for U.S. Appl. No. 12/479,741, filed Aug. 25, 2004, 14 pages.

Final Office Action mailed Oct. 12, 2012, for U.S. Appl. No. 13/351,096, filed Jan. 16, 2012, 17 pages.

Non-Final Office Action mailed Aug. 22, 2007, for U.S. Appl. No. 10/927,575, filed Aug. 25, 2004, 21 pages.

Non-Final Office Action mailed Aug. 22, 2007, for U.S. Appl. No. 11/731,118, filed Mar. 30, 2007, seven pages.

Non-Final Office Action mailed Sep. 10, 2007, for U.S. Appl. No. 10/927,577, filed Aug. 25, 2004, 10 pages.

Non-Final Office Action mailed Jul. 24, 2008, for U.S. Appl. No. 11/731,118, filed Mar. 30, 2007, 14 pages.

Non-Final Office Action mailed Jul. 31, 2008, for U.S. Appl. No. 10/927,577, filed Aug. 25, 2004, 11 pages.

Non-Final Office Action mailed Sep. 17, 2008, for U.S. Appl. No. 10/927,575, filed Aug. 25, 2004, 14 pages.

Non-Final Office Action mailed Aug. 3, 2009, for U.S. Appl. No. 11/731,118, filed Mar. 30, 2007, 10 pages.

Non-Final Office Action mailed Sep. 1, 2009, for U.S. Appl. No. 10/927,575, filed Aug. 25, 2004, 17 pages.

Non-Final Office Action mailed Apr. 1, 2010, for U.S. Appl. No. 12/479,741, filed Aug. 25, 2004, 12 pages.

Non-Final Office Action mailed Jan. 4, 2012, for U.S. Appl. No. 12/479,741, filed Aug. 25, 2004, 17 pages.

Non-Final Office Action mailed Feb. 6, 2012, for U.S. Appl. No. 12/691,702, filed Jan. 21, 2010, 13 pages.

Non-Final Office Action mailed Feb. 29, 2012, for U.S. Appl. No. 13/351,086, filed Jan. 16, 2012, 27 pages.

Non-Final Office Action mailed Oct. 11, 2012, for U.S. Appl. No. 12/242,772, filed Sep. 30, 2008, 19 pages.

Notice of Allowance mailed Mar. 6, 2009, for U.S. Appl. No. 10/927,577, filed Aug. 25, 2004, seven pages.

Notice of Allowance mailed Jul. 12, 2010, for U.S. Appl. No. 10/927,575, filed Aug. 25, 2004, four pages.

Notice of Allowance mailed Sep. 14, 2011, for U.S. Appl. No. 11/731,118, filed Mar. 30, 2007, seven pages.

Office Action for Chinese Patent Application No. 200580027691.3, mailed Jun. 20, 2008, 4 pages.

Office Action for Chinese Patent Application No. 200580027691.3, mailed Mar. 27, 2009, 4 pages.

Office Action for Chinese Patent Application No. 200580027691.3, mailed Sep. 4, 2009, 4 pages.

Office Action for Japanese Patent Application No. 2007-529978, mailed Jul. 27, 2010, 2 pages.

Office Action for Japanese Patent Application No. 2007-529978, mailed Apr. 5, 2011, 2 pages.

Office Action for Japanese Patent Application No. 2007-529978, mailed Nov. 1, 2011, 9 pages.

Oral Proceedings for EP Patent Application No. 05788888.5-2224, mailed Nov. 16, 2009, 11 pages.

Oral Proceedings Summons for EP Patent Application No. 05788888.5-2224, mailed Mar. 18, 2009, 11 pages.

PCT International Preliminary Report and Written Opinion for PCT International Appl. No. PCT/US2005/029467, mailed Mar. 8, 2007, 7 pages.

PCT International Search Report and Written Opinion for PCT International Appl. No. US2005/029467, mailed Apr. 10, 2006, 15 pages.

PCT Invitation to Pay Additional Fees for PCT Appl. No. US2005/029467, mailed Dec. 20, 2005, 5 pages.

TouchPad Advanced Features, Synaptics, "Enriching the Interaction Between Humans and Intelligent Devices," Downloaded Aug. 16, 2004 (2 pages) http://www.synaptics.com/products/touchpad_features.cfm.

Trackpad, Apple Developer Connection (last updated Apr. 19, 2004, printed Aug. 19, 2004) (3 pages) http://developer.apple.com/documentation/Hardware/Developer_Notes/Macintosh_CPUs....

\* cited by examiner

SELECTIVE INPUT SIGNAL REJECTION AND MODIFICATION

CROSS-REFERENCE TO RELATED APPLICATIONS

This application is a continuation of U.S. patent application Ser. No. 12/242,794, filed Dec. 8, 2008 now U.S. Pat. No. 8,294,047, the entire disclosure of which is incorporated herein by reference for all purposes.

FIELD OF THE INVENTION

This relates generally to processing signals from user input devices, and more specifically to selectively rejecting certain types of signals received from user input devices.

BACKGROUND OF THE INVENTION

Many types of input devices are presently available for performing operations in a computing system, such as buttons or keys, mice, trackballs, joysticks, touch sensor panels, touch screens and the like. Touch panels, in particular, are becoming increasingly popular because of their ease and versatility of operation as well as their declining price. Touch screens can include a clear panel with a touch-sensitive surface. A computer or another type of electronic device can process signals generated by the touch panel to determine how and where a user is touching the touch panel.

A multi-touch panel is an advanced type of touch panel that allows multiple touch events to be sensed at the touch panel at the same time. A multi-touch panel allows for more complex user interaction, as it allows an electronic device to detect all areas of a panel that are being touched at any given time. Thus, an electronic device can obtain an "image" indicating the positions and shapes of all touches taking place on a panel at any given time. Furthermore, a multi-touch panel or a device connected thereto can track the movement of one or more touch events over time (e.g., one or more fingers being moved along the surface of the panel). This may allow the tracking of more complex "touch gestures."

Various types of multi-touch panels can be designed. One type provides for sensing touch events based on sensing changes of capacitance caused by a finger or another object touching the panel. An exemplary multi-touch panel of this type is discussed in U.S. application Ser. No. 11/649,998, Pub. No. 20080158172 filed Jan. 3, 2007, the contents of which are incorporated by reference herein in their entirety for all purposes.

While touch sensing (whether single or multi-touch) is undoubtedly beneficial; in certain situations touch sensing may gather too much information. For example, the user may touch the panel or move his/her fingers along the panel unintentionally or at least without intending to convey this action to the computer or device. If the device responds to unintentional actions by the user it may confuse the user or misinterpret commands or other communications received from the user.

SUMMARY OF THE INVENTION

Embodiments of the invention are related to user input devices that accept complex user input including a combination of touch and push (or pick) input. These devices provide much richer user input than many existing user input devices. However, this may result in some unintended consequences. Because the devices of the present invention can detect user actions that were not detectable by previous devices, these devices may also detect certain user actions that were not intended by the user to be machine interface actions.

Therefore, embodiments of the invention provide for selective ignoring or rejection of input received from such devices in order to avoid interpreting unintentional user actions as commands. Furthermore, some input signals can be modified. The selective rejection or modification can be performed by the user interface device itself or by a computing device that includes or is attached to the user interface device. The selective rejection or modification may be performed by a module that processes input signals, performs the necessary rejections and modifications and sends revised input signals to higher level modules.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This generally relates to devices that provide a surface which features a combination of touch sensing and mechanical pick sensing. Touch sensing refers to the sensing of a finger or another object merely touching the surface, while mechanical pick sensing refers to the surface registering a push that actually physically moves or deforms the surface. The touch sensing can be multi or single touch sensing. Embodiments of the invention can detect certain combinations of mechanical and touch sensing data that fit patterns that have been found to often result from unintentional user input, and modify the data in order to remove or reduce the effects of unintentional input.

Although embodiments of the invention may be described and illustrated herein in terms of laptop trackpads and computer mice, it should be understood that embodiments of this invention are not so limited, but are additionally applicable to any input devices that combine touch sensing and mechanical pick sensing. Furthermore, while embodiments may be described and illustrated herein in the context of devices that perform multi-touch sensing, certain embodiments may also include devices that only perform single touch sensing.

Figure 1:
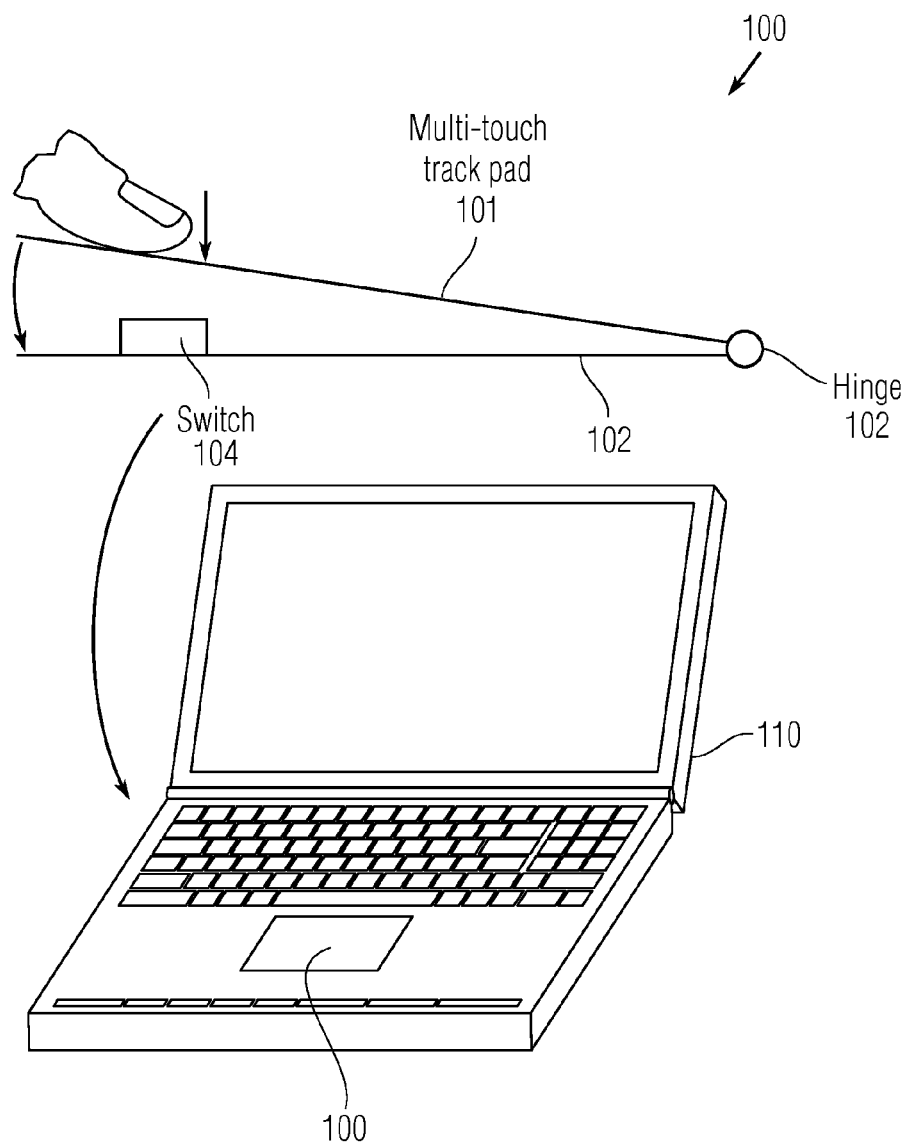
FIG. 1 illustrates an exemplary laptop trackpad according to one embodiment of the invention.

FIG. 1 shows an exemplary user input device according to some embodiments of the invention. The device may include a top surface 101. The top surface can be a multi touch or single touch enabled surface. The top surface can be connected to a base 102 through a hinge 103. Although hinge 103 is shown in the example of FIG. 1 to be at the extreme ends of top surface 101 and base 102, in other embodiments the hinge may instead be located more towards the center of the top surface and base, creating a pivot point that can provide a "rocker switch" action. The hinge may be spring loaded, or another spring or similar mechanism may be used to resiliently separate the top surface from the base.

The top surface can be resiliently movable in a downward direction. A switch 104 may be placed on the base and be activated when the top surface is pressed down. The switch can be a microswitch or other device capable of being actuated. The hinge may ensure that the top surface reverts to its original position after the user stops applying pressure and pushing the surface down.

A user may interact with the touch surface by merely touching it without necessarily depressing it to activate the switch. The user can provide multi touch signals by touching different places of the surface by using, for example, two or more fingers. The user can also input gestures by moving one or more fingers along the surface. This type of input is referred to as touch input. In addition, the user may push the surface down to activate the microswitch. This can be used as another type of user input which is referred to as a pick. Furthermore, the user may combine the two types of inputs. For example, when the user pushes the top surface down, he/she may do so while placing a specific configuration of fingers on the surface, perhaps at a particular location on the surface, and this specific configuration and location may have a specific meaning for the user interface. Also, the user may impart gestures on the top surface while it is pushed down and these gestures may have a specific meaning within the user interface as well. This meaning may be the same as or different than the meaning resulting from performance of similar gestures while the top surface is not pushed down.

Device 100 can be included as a user interface device in various other devices. For, example it can be included as a trackpad of a laptop computer 110. Furthermore, device 100 can be included in other electronic devices such as a trackpad for a stand alone keyboard connected to a personal computer or the like, a standalone trackpad, a trackpad for a toy or a standalone game console, a trackpad for a vending machine, ATM machine or another type of electronic kiosk, etc.

Figure 2:
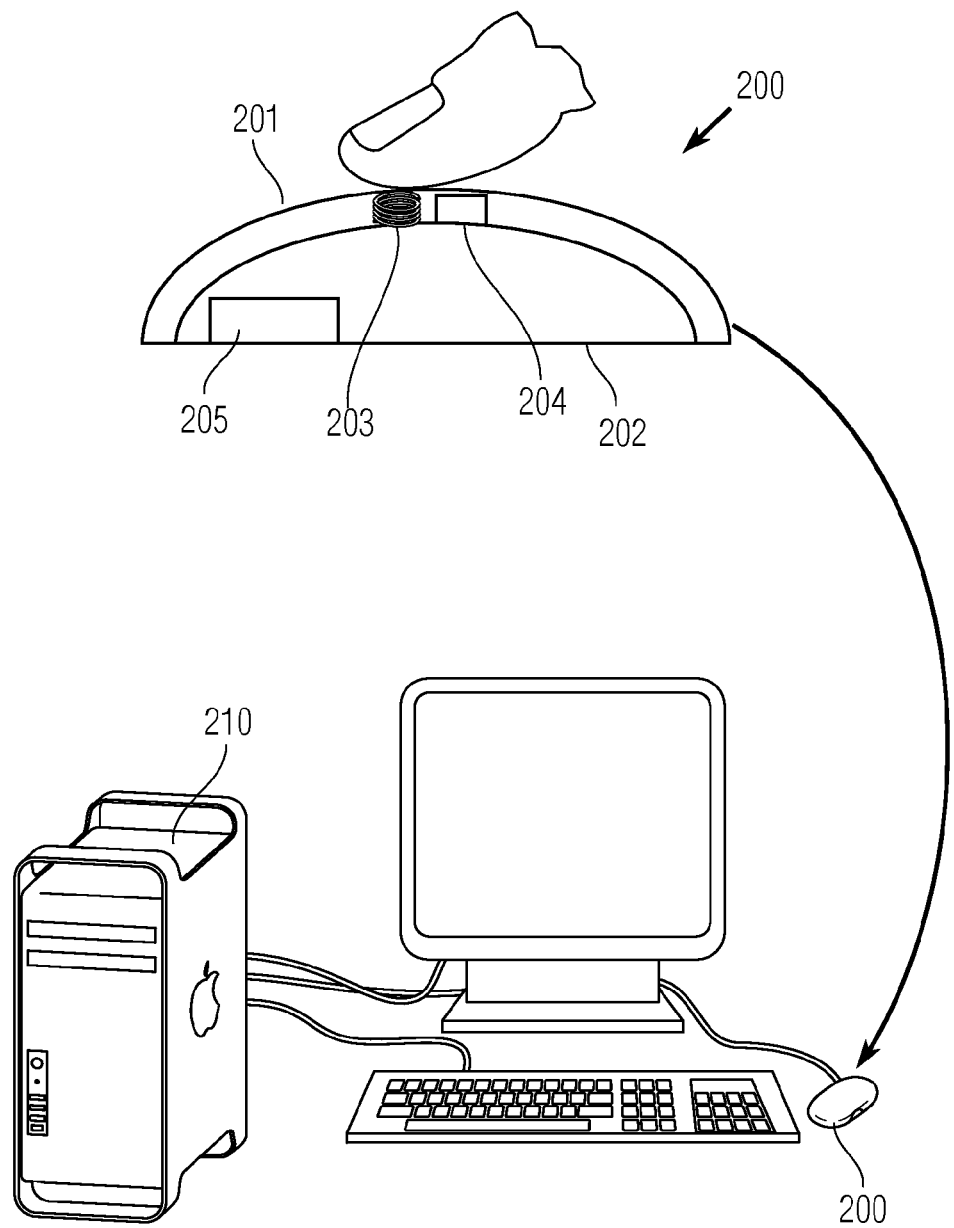
FIG. 2 illustrates an exemplary computer mouse according to one embodiment of the invention.

FIG. 2 shows another exemplary device that includes a combination of touch and pick sensing. Device 200 can be a computer mouse, standalone trackpad or other input device, or the like. It can include a top surface 201 that can be a multi-touch surface. A base 202 can be attached to the top surface through one or more spring elements 203. Guides (not shown) can be used to hold the top surface in position over the base. A switch 204 can be disposed on the base and can be depressible by the top surface when the top surface is pushed down. The device 200 can also include position tracking module 205 that tracks the movement of the device. The position tracking module 205 can be conventional, including for example a ball or a laser tracking system.

As with the trackpad discussed above, the user may be able to convey commands or information to a device attached to device 200 by merely touching the surface of the device (without depressing it), depressing the surface to activate the switch 203 or a combination of both. When imparting multi-touch input, the user can create multi-touch combinations by simultaneously touching different portions of the top surface and/or create gestures by moving one or more fingers and/or other objects along the surface.

The mouse embodiment can be used in conjunction with various existing computer systems, such as computer system 210, or in any other applications where a computer mouse may be considered a useful user input device.

Other types of input devices can combine multi-touch and pick types of interfaces by allowing the user to provide touch and pick input on the same surface, as discussed above. Some of these devices can feature more than one switch allowing for a greater variety in the pick input.

The above types of devices provide much richer user input than many existing user input devices. However, this may result in some unintended consequences. Because the devices of the present invention can detect user actions that were not detectable by previous devices, these devices may also detect certain user actions that were not intended by the user to be machine interface actions. For example, a user may often rest his/her palms on a conventional laptop trackpad while typing, without expecting this to result in any commands to the laptop. However, a version of the trackpad 100 may be depressed as a result of the user's palms and may register a pick.

Therefore, embodiments of the invention provide for selective ignoring or rejection of input received from devices 100 and 200 in order to avoid interpreting unintentional user actions as commands. Furthermore, some input signals can be modified. The selective rejection or modification can be performed by the user interface device itself (e.g., by mouse 200) or by a computing device that includes or is attached to the user interface device (e.g., laptop 110 or computer 210). The selective rejection or modification may be performed by a module that processes input signals, performs the necessary rejections and modifications and sends revised input signals to higher level modules. This is discussed in more detail below in connection with FIG. 7.

In some embodiments, pick inputs are rejected if certain types of touch inputs are present. This can be done because users may push the top surface inadvertently, and often the way they push the top surface can indicate whether the pick was intentional or not.

FIGS. 3 and 4 show a plurality of touch panels and possible touch combinations thereon. Thus, these figures show current states of the touch panels. Touches are indicated by thatched areas in the figures. Embodiments of the invention can be configured to recognize certain touch patterns by the way these patterns are usually caused. For example, a small circle or ellipse can be recognized as a finger or a fingertip, a larger ellipse as a thumb, an even larger ellipse whose minor radius is above a certain threshold (e.g., 11 mm) can be recognized as a palm. Recognition of fingers or other hand parts is discussed in more detail in U.S. Pat. No. 6,323,846 which is hereby incorporated by reference herein in its entirety for all purposes. This subject is also discussed in detail by U.S. patent application Ser. No. 11/619,464 entitled "MULTI-TOUCH INPUT DISCRIMINATION," filed on Jan. 3, 2007 and having Publication No. 20080158145 and U.S. patent application Ser. No. 11/756,211 entitled "MULTI-TOUCH INPUT DISCRIMINATION," filed on May 31, 2007 and having Publication No. 20080158185. These two patent applications are hereby incorporated by reference herein in their entireties for all purposes.

Figure 3A:
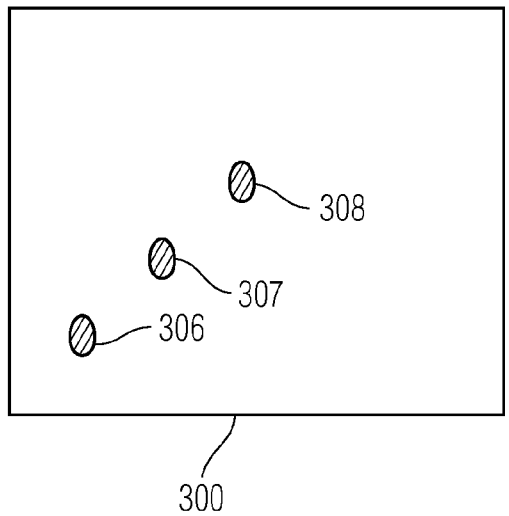
FIGS. 3A-C illustrate a plurality of exemplary touch panels and touch combinations sensed thereon.
Figure 3B:
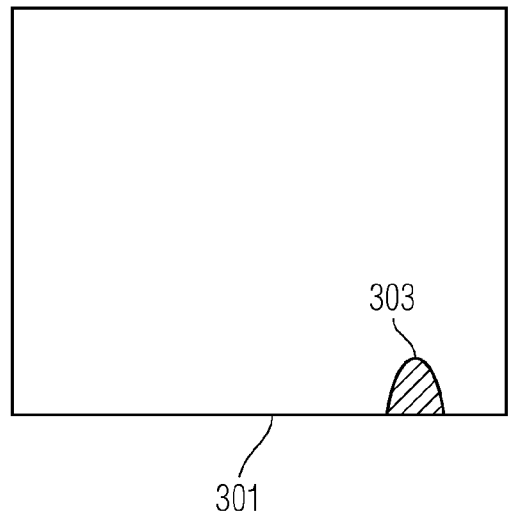
Figure 3C:
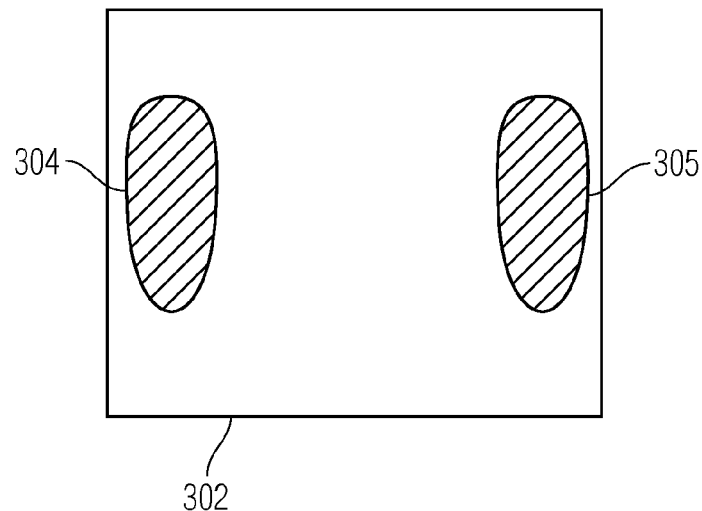

Referring to FIGS. 3A-C, panel 300 of FIG. 3A shows a pattern that may result from the touching of three fingertips on the panel. If such a touch is sensed and a pick is sensed at the same time, embodiments of the invention can allow the pick to be recognized (i.e., not reject it). A pick can be allowed because this pattern usually indicates that the user is intentionally trying to push the surface with his/her fingers. A pick can be allowed in other similar states where a different number of finger touches are present and/or the finger touches are arranged in a different manner. In some embodiments, a pick can be ignored if more than a predefined number of fingers (e.g. 8) appear. A large number of fingers may indicate that the user is resting her hands on the track pad.

The pattern of panel 301 of FIG. 3B shows a portion of a thumb touch 303 appearing in the bottom part of the panel. A pick event that takes place while this touch is appearing can be allowed as it also usually indicates an intentional pick. In fact, all touches that are recognized as thumb touches or portions thereof and appear close to the edges of the panel can cause pick events that occur during those touches to be allowed. In some embodiments, all finger touches or portions thereof that appear close to the edges of the panel, regardless of whether they are recognized as thumbs, can cause simultaneous pick events to be allowed.

Panel 302 of FIG. 3C indicates two patterns (304 and 305) that may be identified as palm touches. If a pick is registered when one or both of these patterns (or patterns similar thereto) appear in these or similar positions (i.e., close to the sides of the panel and relatively parallel to the sides) the pick can be rejected or ignored. The pick rejection is based on the fact that this pattern tends to indicate that the user is simply resting her hands on the trackpad and does not intend to cause a pick. A pick can be similarly rejected if only portions of patterns 304 and 305 appear at the sides of the panel, as long as these portions are recognizable as such.

Figure 4A:
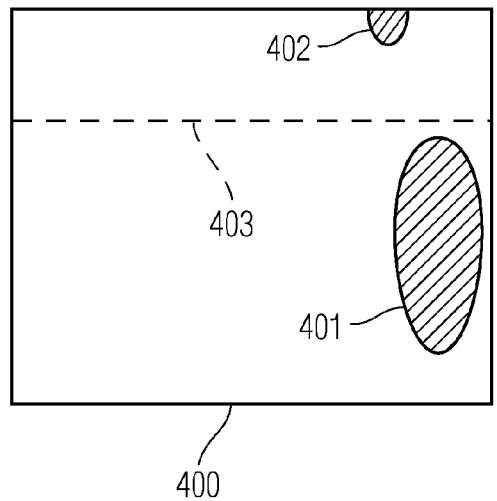
FIGS. 4A-C illustrates a plurality of exemplary touch panels and touch combinations sensed thereon.

Panel 400 of FIG. 4A shows a palm pattern 401 and a portion of a thumb pattern 402. The pattern of panel 400 can also cause any concurrently sensed pick to be rejected, as it can indicate the user resting her hand on the trackpad. The pattern of panel 400 can cause a pick to be rejected even if pattern 402 is not recognized as thumb touch. In general if a palm touch (such as pattern 401), or portion thereof in combination with any finger touch on the top portion of the panel is detected, a contemporaneously detected pick can be ignored. The top portion of the panel can be defined, for example, as the top fifth of the panel (defined by line 403 in FIG. 4A). A mirror image of panel 400 can also result in rejecting a pick.

Figure 4B:
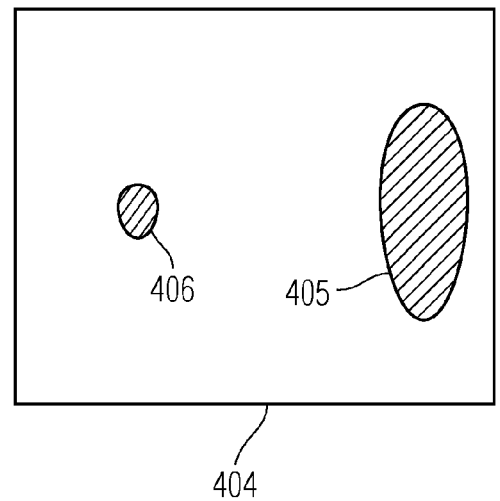
Figure 4C:
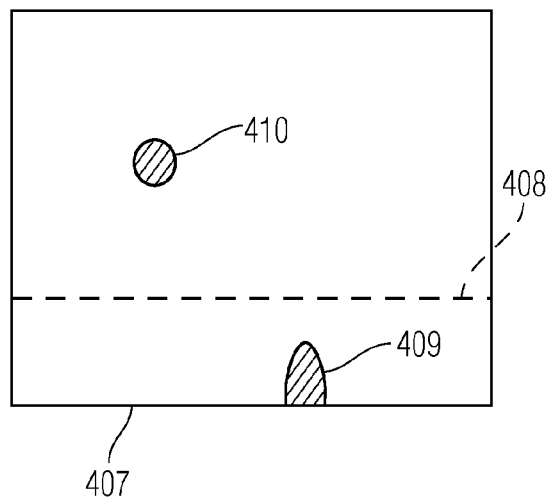

Panel 404 of FIG. 4B shows a finger touch 406 in combination with a palm touch 405 that is close to the side. In pattern 404, the finger touch is not in the upper portion of the panel. This pattern can result in allowing a pick to register, as the finger touch 406 may indicate an intentional push. A pick can also be allowed if palm touch 405 is a partial palm touch. A pattern that mirrors pattern 404 can also result in allowance of a pick.

In some embodiments, if a palm touch such as palm touch 305 appears and causes a detected pick to be ignored, and subsequently a finger such as finger 406 appears while the multi-touch surface is still pushed down, then the pick may continue to be ignored. Furthermore, if a finger touch, such as pattern 402 appears initially and causes a detected pick to be registered, and then a palm touch, such as palm touch 401 appears while the multi-touch surface is pressed down, the pick can continue to be registered. More broadly, in some embodiments, if a pick takes place during a pattern that results in a determination whether to register or ignore the pick, and subsequently the pattern changes while the pick is still taking place, the initial determination may still control, even if the later pattern would result in a different determination.

Some embodiments may allow users to enter touch gestures by moving one or more fingers along the panel. In some embodiments, if a predefined multi-touch gesture is detected to be in progress and a pick is detected while the multi touch gesture is in progress, the pick can be ignored. This may be done because a user may have inadvertently pressed on the panel while trying to perform the gesture.

Other embodiments may allow gestures and picks to be detected simultaneously and may, in certain instances, provide for a different behavior in such events. For example, some embodiments may allow a user to move an object around the desktop by performing a pick to "pick up the object" and while the pick is being performed (i.e., the panel is being pushed down), performing a gesture to move the object.

When processing gestures, the concept of a lowest path may be defined. In some embodiments the lowest path may be chosen simply as the touch that is the lowest on the panel (i.e., it has the lowest y coordinate). In other embodiments, the lowest path may be chosen as a touch that is both relatively low and relatively stationary. In one example of the latter embodiments, the lowest path may be chosen based on the height and the movement rate of each touch. If there are a plurality of touches on a panel at a given time, the following parameters can be measured for each touch: the height y of the touch and the distance d, the touch has moved during a predefined period of time. (The predefined period of time can be a relatively short period, such as 0.1 s). The lowest path may be the touch for which (d+y) is minimal. In other embodiments, the expression (ad+by) can be used, where a and b are predefined constants. The lowest path is usually a thumb, but can be another finger or object.

In some embodiments, touch events can be ignored as well. One such example is shown in panel 407 of FIG. 4C. In embodiments illustrated by that panel, a thumb resting zone can be defined in the lower portion of the panel below line 408. The thumb resting zone can be, for example, 1 cm thick. If a lowest path (such as, e.g., lowest path 409) appears in the thumb resting zone, any picks that are received may be registered, but the touch input of the lowest path can be rejected or ignored. This may happen because the user may be touching the panel only to rest her finger or perform a pick and does not intend to perform any touch input. Ignoring touches in various resting zones is discussed in more detail in U.S. patent application Ser. No. 12/242,772 entitles "SELECTIVE REJECTION OF TOUCH CONTACTS IN AN EDGE REGION OF A TOUCH SURFACE", which is hereby incorporated by reference herein in its entirety for all purposes. If the lowest path is moved and leaves the thumb resting zone, its touch input can be allowed. However, if there is another finger touch detected on the panel (such as finger touch 410) and that other finger touch moves more than a predefined distance (e.g., 1 cm) from the time the finger touch 410 appears to the time the lowest path 409 leaves the thumb resting zone, the lowest path 409 can be permanently ignored (i.e., ignored until the user lifts her finger), regardless of where it moves. This can be done because the user may be concentrating on performing a gesture with her finger (i.e., touch 410) and unintentionally let her thumb (i.e., lowest path 409) drift up out of the resting zone.

In some embodiments, if a lowest path has been moving for at least a predefined period of time before another finger touches, the lowest path is ignored after the touch of the other finger. The predefined time can be, for example, ¼ of a second.

In some embodiments, if there is a pick detected when there is more than one finger touch presently detected, then the lowest path is selected from the present touches and the lowest path is ignored while the pick is ongoing (i.e., while the user is pushing the panel down). It should be noted that in these embodiments if there is only one touch being detected when a pick is detected, this touch is not ignored.

If the lowest path is rejected under the above scenario, a memory flag can be set so that the lowest path continues being rejected until it completely lifts off the surface or all other touches lift off the surface leaving the lowest path as the only remaining touch or the pick is released and the lowest path is not identified as a thumb path.

A path or a touch can be identified as a thumb path, by examining geometric qualities of the touch pattern and determining whether the pattern is likely to have resulted from a thumb touch. For example, a thumb touch can be larger and more elliptical than an ordinary finger touch. In the above discussed scenario, if the lowest path is identified as a thumb path and is not alone, it will continue to be rejected after the pick has been released. The lowest path behavior discussed above can be distinct from and need not depend upon the thumb resting zone behavior discussed in connection with FIG. 4C above.

It is recognized that, in some situations, the user's fingers may unintentionally slide on the surface of the panel when the user pushes the panel down (i.e., performs a pick) and when the user allows the panel to revert to its original state. This can be especially true for curved panels such as the panel for the mouse of FIG. 2, but may also take place for flat panels, such as the one shown in FIG. 1.

Figure 5:
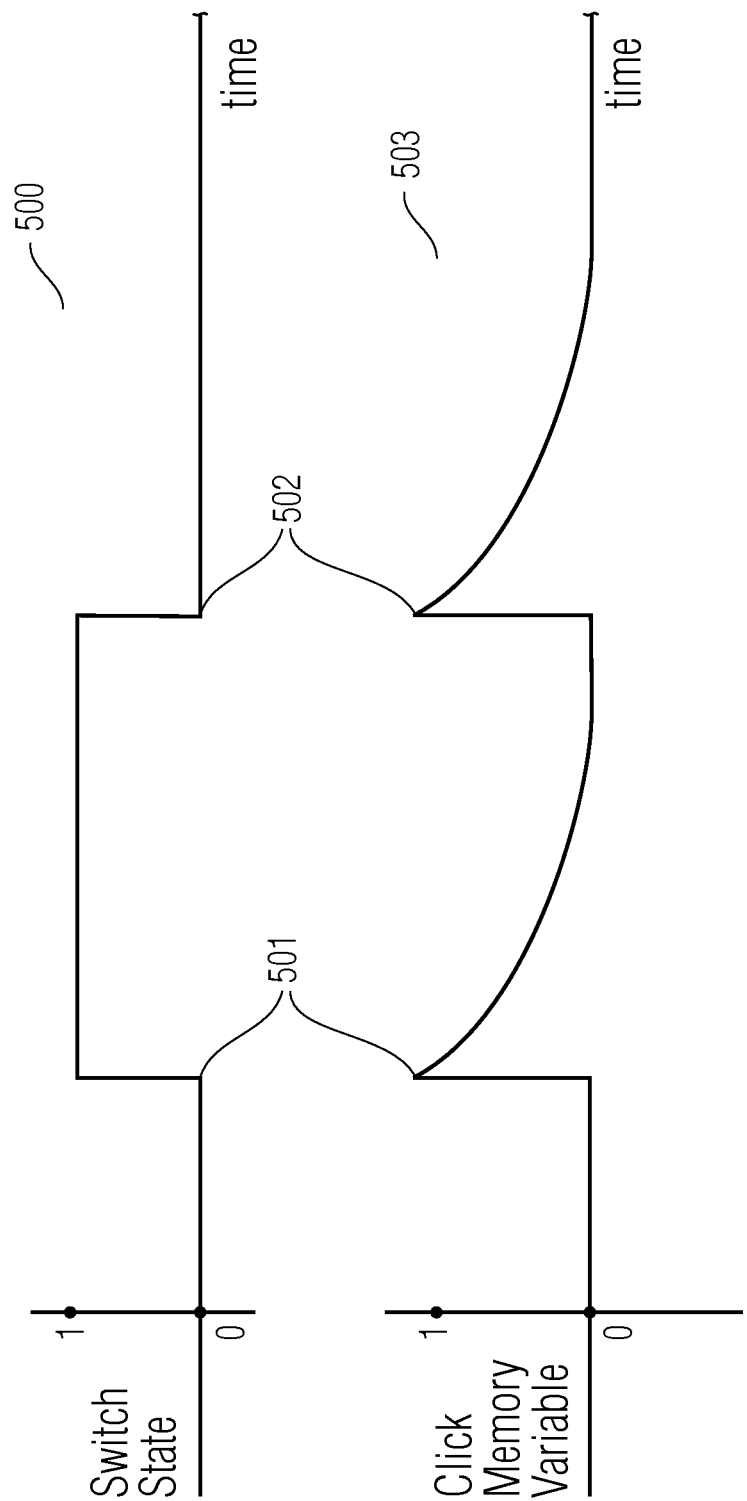
FIG. 5 illustrates exemplary switch state and clock memory variable graphs according to one embodiment of the invention.

Graph 500 of FIG. 5 shows the state of a switch of the mechanical switch during the performance of a pick. Switch state 0 may indicate that the top surface has not been pushed down against the switch. Switch state 1 may indicate that the top surface is being pushed down, or that a pick is being performed. At time 501, the user pushes down the tops surface causing the state to change from 0 to 1. The user keeps the top surface pressed down until point 502. At point 502, the user releases the top surface causing it to revert to its original position or to change back to 0.

The user may but need not remove her fingers from the top surface when releasing it. She can release it by merely removing pressure from the surface but keeping her fingers touching the surface. The user may wish to release the surface without removing her fingers therefrom in order to perform or continue performing a desired touch input or gesture. However, as noted above, the user may unintentionally move her fingers along the multi-touch panel when initially pressing down and when releasing the top surface. This may happen as a result of the change of pressure between the user's fingers and the surface. This may interfere with the touch input or gesture the user is trying to perform. Furthermore, if the user is already moving her fingers along the surface of the touch panel, the act of pushing or releasing the touch panel can result in an unintentional change of the speed of movement. Therefore embodiments of the invention provide for removing the effects of this unintentional finger movement by modifying detected touch inputs.

This modification can be performed based on an internal variable referred to as the click memory variable, or CMV. Graph 503 of FIG. 5 shows the state of the CMV according some embodiments over a period of time. The click memory variable can have values between 1 and 0. It can be reset to 1 every time a change of the switch state takes place. This, the CMV can be set to 1 at points 501 and 502. Once at a non-zero value, the CMV can exponentially decay over time until it reaches 0. This can be accomplished, for example, by performing the following calculation periodically:

$$CMV_{NEW} = 0.9 \cdot CMV_{OLD} \qquad \text{EQ1}$$

In different embodiments the coefficient (0.9) and the period of calculation may vary. Due to the rounding inherent in electronic calculations, EQ1 will result in the CMV decaying to 0 some time after a change of the switch state unless a new change of the switch state resets the CMV back to 1.

Each touch pattern that forms a separate geometrical object can be considered a touch object. Thus, for example, referring to panel 300, finger touch patterns 306-308 can be considered separate touch objects. Palm touch patterns 304 and 305 of panel 302 can also be considered separate touch objects. The velocity of each touch object on the panel can be calculated. In some embodiments, this velocity calculation need only be done when the value of CMV is other than 0. The velocity of the touch objects can then be changed according to the following formula:

$$V_R = \begin{cases} V_{IN} - K \cdot CMV & V_{IN} > K \cdot CMV \\ 0 & -K \cdot CMV \leq V_{IN} \leq K \cdot CMV \\ V_{IN} + K \cdot CMV & V_{IN} < -K \cdot CMV \end{cases} \qquad \text{EQ 2}$$

where $V_{IN}$ is the initial or sensed velocity, $V_R$ is the resulting or modified velocity and K is a predefined constant. A suitable constant K may be chosen by experimentation.

Figure 6:
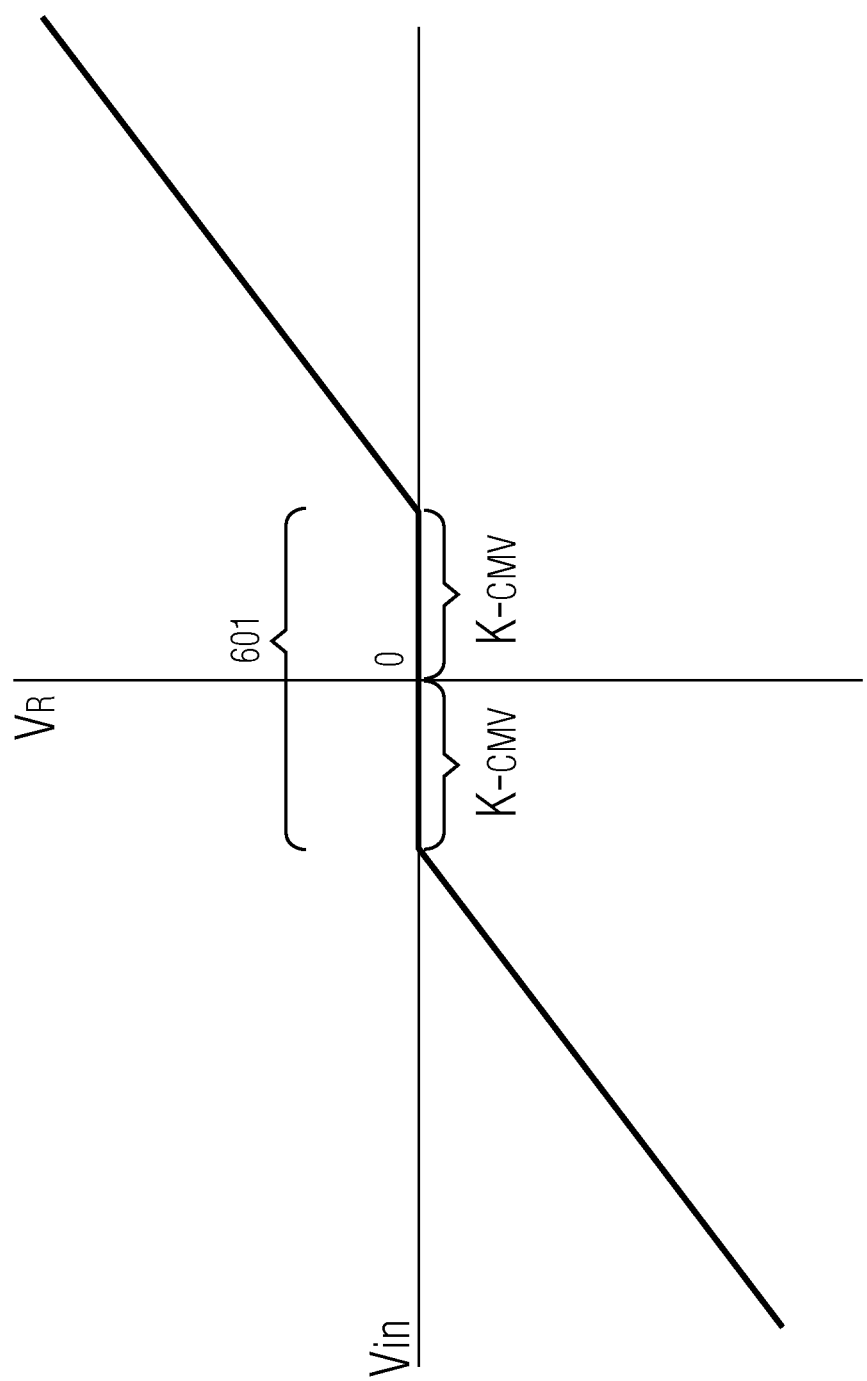
FIG. 6 illustrates an exemplary initial velocity to revised velocity graph according to one embodiment of the invention.

The result of equation 0 is shown in FIG. 6. FIG. 6 is a graph of the revised velocity as related to the initial velocity for a predefined value of CMV. As can be seen, the revised velocity is generally proportional to the initial velocity except for a dead-zone range 601, defined by K·CMV. Thus, the velocity modification is similar to dead-zone filtering. The dead-zone represents a velocity range for which the initial sensed velocity of various touch objects is likely to be entirely due to the unintentional consequences of a user pushing or releasing the top surface.

Thus, embodiments of the present invention provide that slower touch objects may be stopped (i.e., their velocity may be made equal to 0), while the velocity of faster touch objects may be reduced based on the value of CMV.

The graph of FIG. 6 may indicate the relationship of velocities only at single moment in time. As time passes, the value of CMV may change and the relationship of FIG. 6 may change. More specifically, provided there is no new panel push or release event, the value of CMV may decay, which may result in a decrease of the dead-zone. Thus, the modification of touch object velocities decreases as the value of CMV decreases or as time passes from the last push or release event. Eventually, CMV may go to 0, at which point no modification of velocities is performed. This may reflect the fact that any unintentional effects of pushing or releasing the top surface decrease over time and eventually disappear.

In some embodiments, the calculation of Equation 2 can be performed for vertical and horizontal (x and y) components of the velocities of each object. Thus, $V_{R,x}$ and $V_{R,y}$ can be calculated based on $V_{IN,x}$ and $V_{IN,y}$, respectively. In some embodiments, modified velocities of the touch objects can be sent to higher level modules. Alternatively, or in addition, the modified velocities can be used to determine modified positions of the various touch objects at later times and these modified positions can be sent to the higher level modules.

The above speed modification can be performed for the input device of FIG. 2 and/or similar devices as it is especially useful for input devices featuring non-flat top surfaces. However, it can also be performed for devices featuring flat top surfaces, such as laptop trackpads, etc.

The various input signal rejection and modification strategies discussed above can be combined where not mutually exclusive. Thus, any device can feature a combination one or more of the strategies discussed above.

Figure 7:
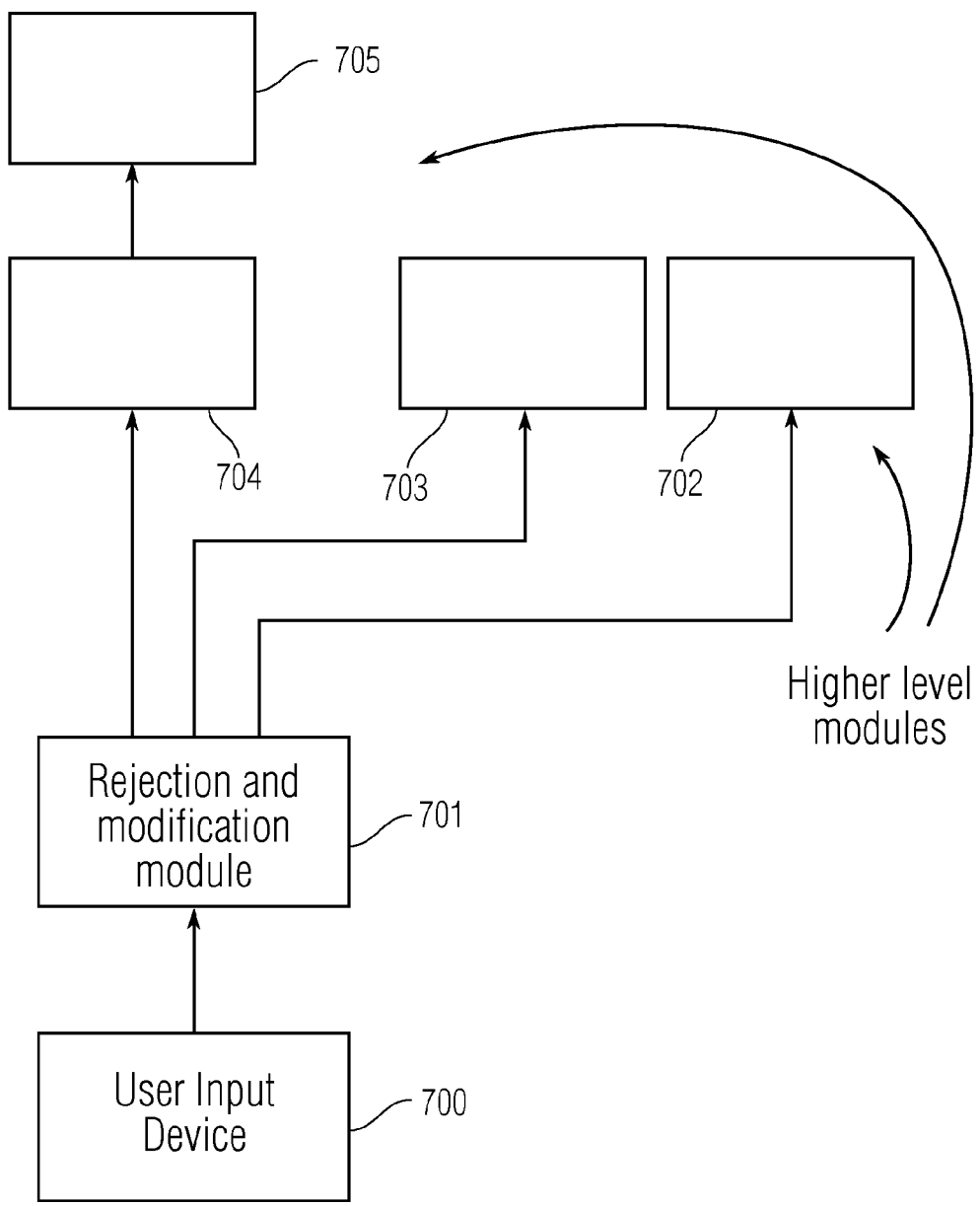
FIG. 7 illustrates an exemplary block diagram of one embodiment of the invention.

FIG. 7 is a block diagram showing a modular representation of embodiments of the present invention. FIG. 7 can describe various embodiments, such as the laptop of FIG. 1, the computer of FIG. 2, etc. Block 700 represents the user input device. This can be the combination touch (or multi-touch) and mechanical pick input device discussed above. The user input device may be the trackpad of FIG. 1, the mouse of FIG. 2 or another device that combines touch sensing and mechanical pick sensing. Block 701 is a rejection and modification module. This module may take in user input data from the user input device, modify it and/or reject various sets of data as discussed above, and send the modified data to higher level modules 702-705.

The rejection and modification module may be implemented in application specific hardware. Alternatively, it may be implemented as software running on a programmable processor. In the latter alternative, the rejection and modification module may include a processor, a memory and software stored in the memory that is read and executed by the processor. The rejection and modification module need not be directly connected to the user input device. There may instead be one or more intervening modules between blocks 700 and 701. These may include modules for digitization, normalization and/or compression of the input data of the input device, modules that perform other types of error correction of the input data, or modules that process the input data in other respects, such as segmentation modules that organize raw pixel based input touch data into distinct touch objects that define specific regions that have been touched. Since rejections can be considered to be types of modifications, the rejection and modification module can also be referred to as a modification module.

The modified input data created by the rejection and modification module can be used by higher level modules. For example, higher level modules may perform further processing and modification of the input data. Alternatively, higher level modules may actually use the input data to perform user interactions. Thus, some higher level modules can be applications, such as web browsers, email clients, etc. The higher level modules may also be implemented as software running on a programmable processor or as application specific hardware. When implemented as software, the higher level modules may include software that is stored at the same memory as that of the rejection and modification module, or software that is separately stored. Furthermore, the higher level modules may be executed at the same or a different processor than the rejection and modification module. The device discussed above, whether it be a laptop computer, a desktop computer, or another type device, can feature better and more intuitive user interaction by providing a rich user input interface without requiring users to concentrate on preventing unintentional user input.

While some embodiments discussed above are discussed mostly with reference to rectangular panels, such embodiments may also be used in the context of non-rectangular or curved panels. Embodiments having curved panels may still feature "flat" or two dimensional representation of the touch data sensed on the panels, and may therefore be related to the panels discussed in FIGS. 3 and 4.

Various user input devices that could be used in accordance with embodiments of the present invention were discussed above in connection with FIGS. 1 and 2. The text below and FIGS. 8-13 provide additional, more detailed description of some of these types of user input devices. The invention is not limited to the user input devices discussed below.

Figure 8:
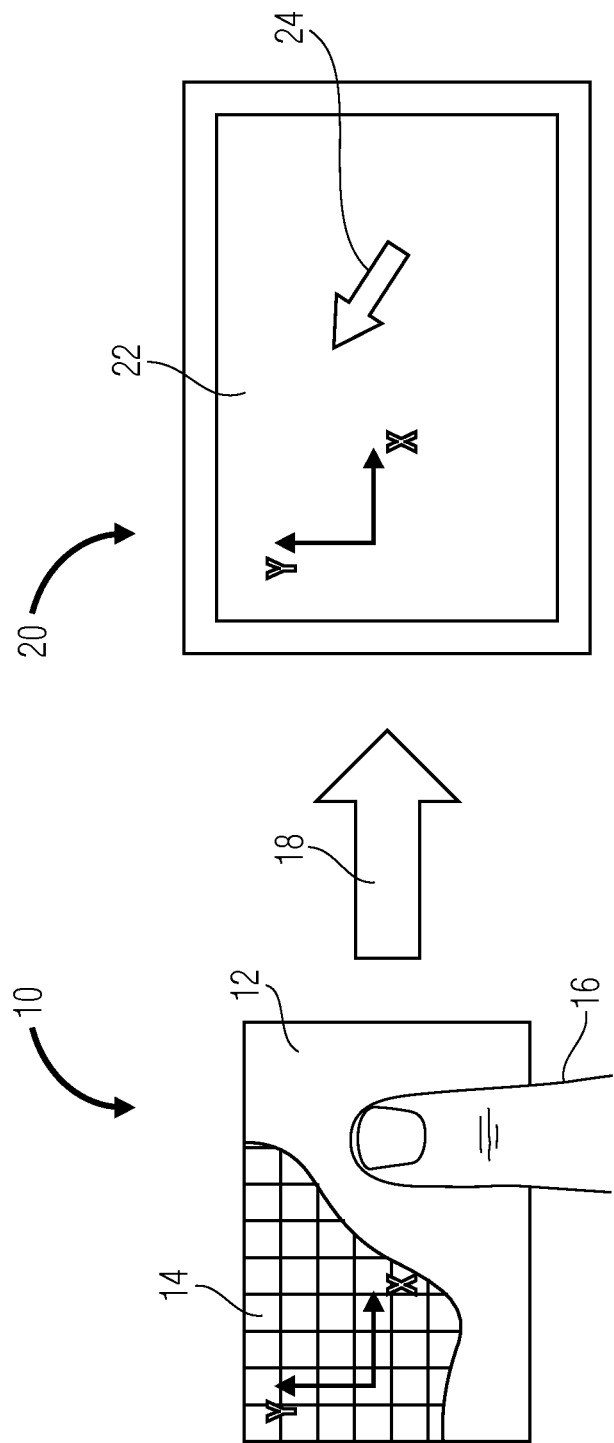
FIG. 8 is a simplified diagram of an exemplary touch pad and display according to one embodiment of the invention.
Figure 9:
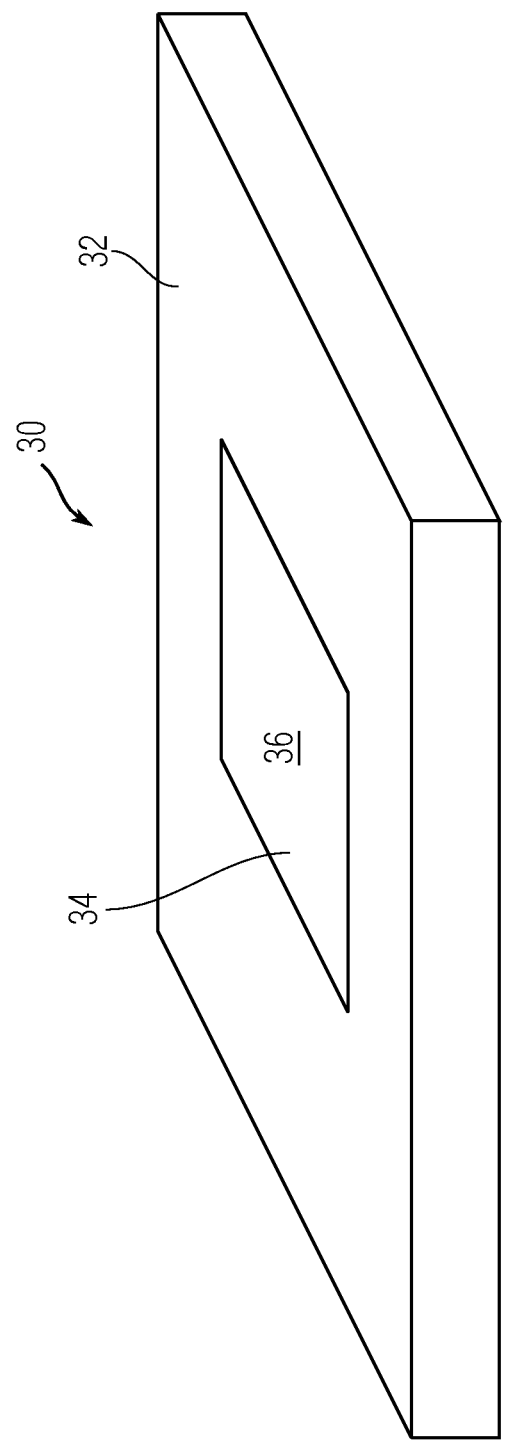
FIG. 9 is a perspective view of an exemplary input device, in accordance with one embodiment of the invention.

Referring to FIG. 8, a touch-sensitive track pad 10 will be described in greater detail. The track pad is generally a small (often rectangular) area that includes a protective/cosmetic shield 12 and a plurality of electrodes 14 disposed underneath the protective shield 12. Electrodes 14 may be located on a circuit board, for example a printed circuit board (PCB). For ease of discussion, a portion of the protective shield 12 has been removed to show the electrodes 14. Different electrodes 14 or combinations thereof can represent different x, y positions. In one configuration, as a finger 16 (or alternately a stylus, not shown) approaches the electrode grid 14, the finger may form a capacitance with one or more electrodes proximate to the finger or may change existing capacitances between one or more such electrodes. The circuit board/sensing electronics (not shown) measures such capacitance changes and produces an input signal 18 which is sent to a host device 20 (e.g., a computing device) having a display screen 22. The input signal 18 is used to control the movement of a cursor 24 on a display screen 22. As shown, the input pointer moves in a similar x, y direction as the detected x, y finger motion. FIG. 9 is a simplified perspective view of an input device 30, in accordance with one embodiment of the present invention. The input device 30 is generally configured to send information or data to an electronic device (not shown) in order to perform an action on a display screen (e.g., via a graphical user interface (GUI)). For example, moving an input pointer, making a selection, providing instructions, etc. The input device may interact with the electronic device through a wired (e.g., cable/connector) or wireless connection (e.g., IR, bluetooth, etc.).

The input device 30 may be a stand alone unit or it may be integrated into the electronic device. When in a stand alone unit, the input device typically has its own enclosure. When integrated with an electronic device, the input device typically uses the enclosure of the electronic device. In either case, the input device may be structurally coupled to the enclosure as for example through screws, snaps, retainers, adhesives and the like. In some cases, the input device may be removably coupled to the electronic device as for example through a docking station. The electronic device to which the input device is coupled may correspond to any consumer related electronic product. By way of example, the electronic device may correspond to a computer such as a desktop computer, laptop computer or PDA, a media player such as a music player, a communication device such as a cellular phone, another input device such as a keyboard, and the like.

As shown in FIG. 9, the input device 30 includes a frame 32 (or support structure) and a track pad 34. The frame 32 provides a structure for supporting the components of the input device. The frame 32 in the form of a housing may also enclose or contain the components of the input device. The components, which include the track pad 34, may correspond to electrical, optical and/or mechanical components for operating the input device 30.

Track pad 34 provides an intuitive interface configured to provide one or more control functions for controlling various applications associated with the electronic device to which it is attached. By way of example, the touch initiated control function may be used to move an object or perform an action on the display screen or to make selections or issue commands associated with operating the electronic device. In order to implement the touch initiated control function, the track pad 34 may be arranged to receive input from a finger (or object) moving across the surface of the track pad 34 (e.g., linearly, radially, angular, etc.), from a finger holding a particular position on the track pad 34 and/or by a finger tapping on a particular position of the track pad 34. As should be appreciated, the touch pad 34 provides easy one-handed operation, i.e., lets a user interact with the electronic device with one or more fingers.

The track pad 34 may be widely varied. For example, the touch pad 34 may be a conventional track pad based on the Cartesian coordinate system, or the track pad 34 may be a touch pad based on a polar coordinate system. An example of a touch pad based on polar coordinates may be found in U.S. Pat. No. 7,046,230 to Zadesky et al., entitled "TOUCH PAD FOR HANDHELD DEVICE", filed Jul. 1, 2002, which is hereby incorporated by reference herein in its entirety for all purposes.

The track pad 34 may be used in a relative or absolute mode. In absolute mode, the track pad 34 reports the absolute coordinates of where it is being touched. For example x, y in the case of the Cartesian coordinate system or (r, 0) in the case of the polar coordinate system. In relative mode, the track pad 34 reports the direction and/or distance of change. For example, left/right, up/down, and the like. In most cases, the signals produced by the track pad 34 direct motion on the display screen in a direction similar to the direction of the finger as it is moved across the surface of the track pad 34.

The shape of the track pad 34 may be widely varied. For example, the track pad 34 may be circular, oval, square, rectangular, triangular, and the like. In general, the outer perimeter of the track pad 34 defines the working boundary of the track pad 34. In the illustrated embodiment, the track pad is rectangular. Rectangular track pads are common on laptop computers. Circular track pads allow a user to continuously swirl a finger in a free manner, i.e., the finger can be rotated through 360 degrees of rotation without stopping. Furthermore, the user can rotate his or her finger tangentially from all sides thus giving it more range of finger positions. Both of these features may help when performing a scrolling function, making circular track pads advantageous for use with portable media players (e.g., iPod media players produced by Apple Inc. of Cupertino, Calif.). Furthermore, the size of the track pad 34 generally corresponds to a size that allows them to be easily manipulated by a user (e.g., the size of a finger tip or larger).

The track pad 34, which generally takes the form of a rigid planar platform, includes a touchable outer track surface 36 for receiving a finger (or object) for manipulation of the track pad. Although not shown in FIG. 9, beneath the touchable outer track surface 36 is a sensor arrangement that is sensitive to such things as the pressure and/or motion of a finger thereon. The sensor arrangement typically includes a plurality of sensors that are configured to activate as the finger sits on, taps on or passes over them. In the simplest case, an electrical signal is produced each time the finger is positioned over a sensor. The number of signals in a given time frame may indicate location, direction, speed, and acceleration of the finger on the track pad 34, i.e., the more signals, the more the user moved his finger. In most cases, the signals are monitored by an electronic interface that converts the number, combination and frequency of the signals into location, direction, speed and acceleration information. This information may then be used by the electronic device to perform the desired control function on the display screen. The sensor arrangement may be widely varied. By way of example, the sensors may be based on resistive sensing, surface acoustic wave sensing, pressure sensing (e.g., strain gauge), infra red sensing, optical sensing, dispersive signal technology, acoustic pulse recognition, capacitive sensing and the like.

In the illustrated embodiment, the track pad 34 is based on capacitive sensing. As is generally well known, a capacitance-based track pad is arranged to detect changes in capacitance as the user moves an object such as a finger around the track pad. In most cases, the capacitive track pad includes a protective shield, one or more electrode layers, a circuit board and associated electronics including an application specific integrated circuit (ASIC). The protective shield is placed over the electrodes; the electrodes are mounted on the top surface of the circuit board; and the ASIC is mounted on the bottom surface of the circuit board. The protective shield serves to protect the underlayers and to provide a surface for allowing a finger to slide thereon. The surface is generally smooth so that the finger does not stick to it when moved. The protective shield also provides an insulating layer between the finger and the electrode layers. The electrode layer includes a plurality of spatially distinct electrodes. Any suitable number of electrodes may be used. In most cases, it would be desirable to increase the number of electrodes so as to provide higher resolution, i.e., more information can be used for things such as acceleration.

Capacitive sensing works according to the principals of capacitance. As should be appreciated, whenever two electrically conductive members come close to one another without actually touching, their electric fields interact to form capacitance. In the configuration discussed above, the first electrically conductive member is one or more of the electrodes and the second electrically conductive member is, for example, the finger of the user. Accordingly, as the finger approaches the touch pad, a tiny capacitance forms between the finger and the electrodes in close proximity to the finger. The capacitance in each of the electrodes is measured by an ASIC located on the backside of the circuit board. By detecting changes in capacitance at each of the electrodes, the ASIC can determine the location, direction, speed and acceleration of the finger as it is moved across the touch pad. The ASIC can also report this information in a form that can be used by the electronic device.

In accordance with one embodiment, track pad 34 is movable relative to frame 32 so as to initiate another set of signals (other than just tracking signals). By way of example, track pad 34 in the form of the rigid planar platform may rotate, pivot, slide, translate, flex and/or the like relative to frame 32. Track pad 34 may be coupled to frame 32 and/or it may be movably restrained by frame 32. By way of example, track pad 34 may be coupled to frame 32 through screws, axels, pin joints, slider joints, ball and socket joints, flexure joints, magnets, cushions and/or the like. Track pad 34 may also float within a space of the frame (e.g., gimbal). It should be noted that the input device 30 may additionally include a combination of joints such as a pivot/translating joint, pivot/flexure joint, pivot/ball and socket joint, translating/flexure joint, and the like to increase the range of motion (e.g., increase the degree of freedom). When moved, touch pad 34 is configured to actuate a circuit that generates one or more signals. The circuit generally includes one or more movement indicators such as switches, sensors, encoders, and the like. An example of a gimbaled track pad may be found in patent application Ser. No. 10/643,256, entitled, "MOVABLE TOUCH PAD WITH ADDED FUNCTIONALITY," filed Aug. 18, 2003, which is hereby incorporated by reference herein in its entirety for all purposes.

Figure 10A:
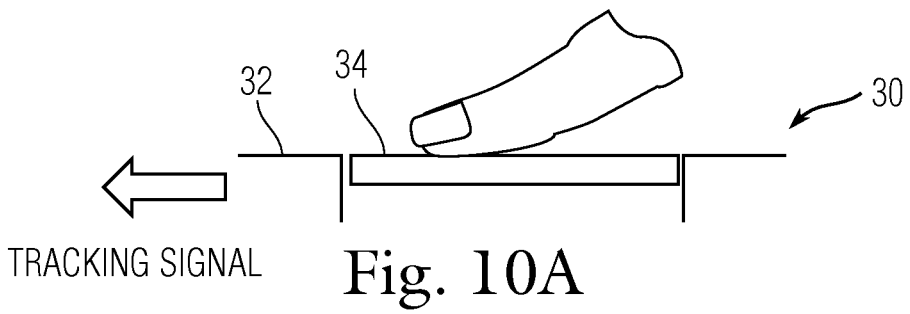
FIGS. 10A-D are simplified side views of an exemplary input device having a button touch pad, in accordance with one embodiment of the invention.
Figure 10B:
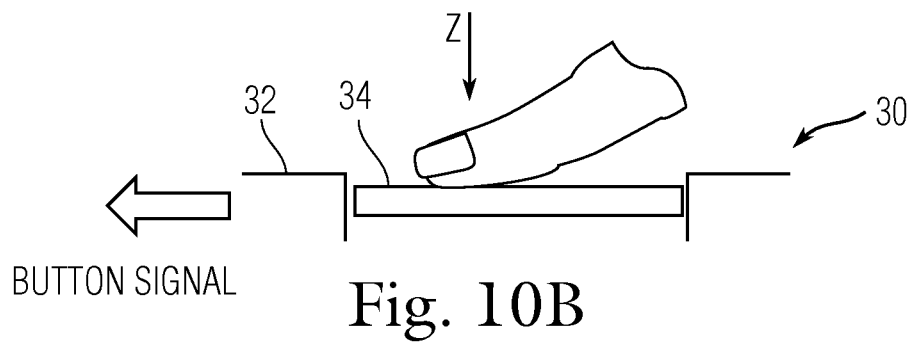
Figure 10C:
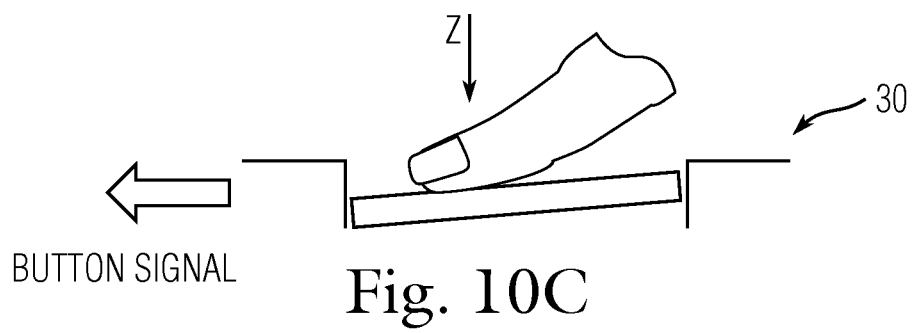

In the illustrated embodiment, track pad 34 takes the form of a depressible button that performs a "picking" action. That is, a portion of the entire track pad 34 acts like a single or multiple button such that one or more additional button functions may be implemented by pressing on track pad 34 rather than tapping on the track pad or using a separate button/separate zone. As shown in FIGS. 10A and 10B, according to one embodiment of the invention, track pad 34 is capable of moving between an upright (or neutral) position (FIG. 10A) and a depressed (or activate) position (FIG. 10B) when a force from a finger 38, palm, hand, or other object is applied to the track pad 34. The force should not be so small as to allow for accidental activation of the button signal, but not so large as to cause user discomfort by requiring undue pressure. Track pad 34 is typically biased in the upright position as for example through a flexure hinge, a spring member, or magnets. Track pad 34 moves to the activate position when the bias is overcome by an object pressing on track pad 34. As shown in FIG. 10C, the track pad 34 may be pivoted at one end such that the activate position is slightly inclined with respect to the neutral position. When the finger (or other object) is removed from track pad 34, the biasing member urges it back towards the neutral position. A shim or other structure (not shown) may prevent track pad 34 from overshooting the neutral position as it returns. For example, a portion of frame 32 may extend outwardly above a portion of track pad 34 so as to stop track pad 34 at the neutral position. In this way, the track surface can be kept flush with frame 32 if desired. For example, in laptop computers or handheld media devices, it may be desirable to have the track pad flush with the housing of the computer or device.

Figure 10D:
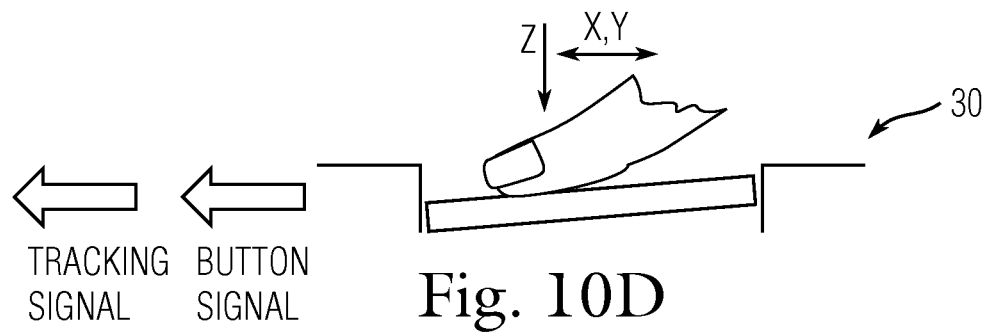

As shown in FIG. 10A, in the upright/neutral position, track pad 34 generates tracking signals when an object such as a user's finger is moved over the top surface of the touch pad in the x,y plane. Although FIG. 10A depicts the neutral position as being upright, the neutral position may be situated at any orientation. As shown in FIG. 10B, in the depressed position (z direction), track pad 34 generates one or more button signals. The button signals may be used for various functionalities including but not limited to making selections or issuing commands associated with operating an electronic device. By way of example, in the case of a music player, the button functions may be associated with opening a menu, playing a song, fast forwarding a song, seeking through a menu and the like. In the case of a laptop computer, the button functions can be associated with opening a menu, selecting text, selecting an icon, and the like. As shown in FIG. 10D, input device 30 may be arranged to provide both the tracking signals and the button signal at the same time, i.e., simultaneously depressing the touch pad 34 in the z direction while moving tangentially along the track surface (i.e., in the x, y directions). In other cases, input device 30 may be arranged to only provide a button signal when touch pad 34 is depressed and a tracking signal when the touch pad 34 is upright.

To elaborate, track pad 34 is configured to actuate one or more movement indicators, which are capable of generating the button signal when track pad 34 is moved to the activate position. The movement indicators are typically located within frame 32 and may be coupled to track pad 34 and/or frame 32. The movement indicators may be any combination of switches and sensors. Switches are generally configured to provide pulsed or binary data such as activate (on) or deactivate (off). By way of example, an underside portion of track pad 34 may be configured to contact or engage (and thus activate) a switch when the user presses on track pad 34. The sensors, on the other hand, are generally configured to provide continuous or analog data. By way of example, the sensor may be configured to measure the position or the amount of tilt of touch pad 34 relative to the frame when a user presses on the track pad 34. Any suitable mechanical, electrical and/or optical switch or sensor may be used. For example, tact switches, force sensitive resistors, pressure sensors, proximity sensors and the like may be used.

Track pads 10 and 30 shown in FIGS. 8-10 may, in some embodiments, be multi-touch trackpads. Multi-touch consists of a touch surface (screen, table, wall, etc.) or touchpad, as well as software that recognizes multiple simultaneous touch points, as opposed to the standard touchscreen (e.g., computer touchpad, ATM), which recognizes only one touch point. This effect is achieved through a variety of means, including but not limited to: capacitive sensing, resistive sensing, surface acoustic wave sensing, heat, finger pressure, high capture rate cameras, infrared light, optic capture, tuned electromagnetic induction, and shadow capture. An example of a multi-touch mobile phone is the iPhone produced by Apple Inc. of Cupertino, Calif. An example of a multi-touch media device is the iPod Touch produced by Apple Inc. Examples of laptop computers having multi-touch track pads are the MacBook Air and MacBook Pro produced by Apple Inc. All of the input devices described herein may employ multi-touch technology in some embodiments; alternatively the input devices described herein may employ single touch track pads.

Figure 11:
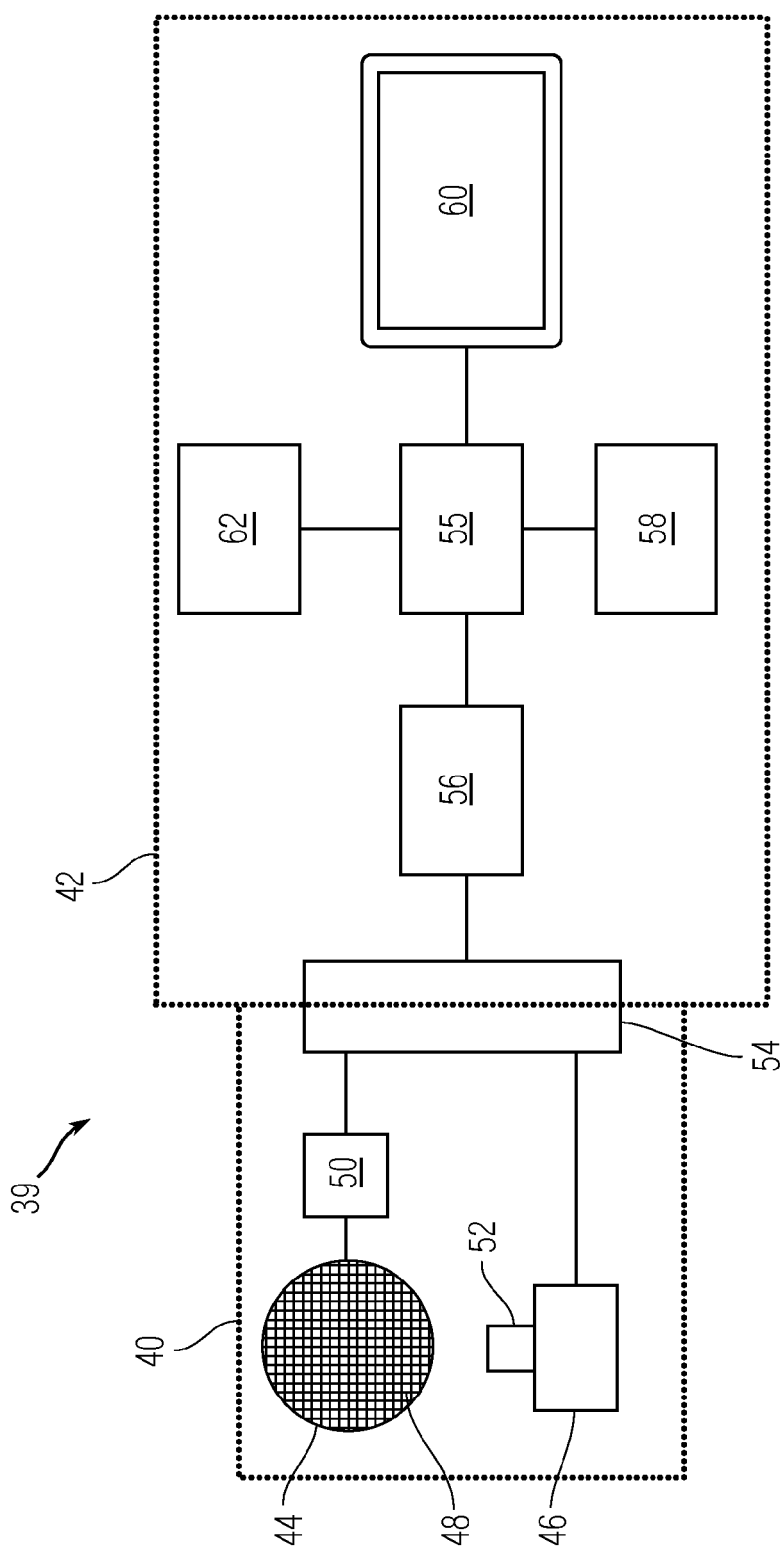
FIG. 11 is a simplified block diagram of an exemplary input device connected to a computing device, in accordance with one embodiment of the invention.

FIG. 11 is a simplified block diagram of a computing system 39, in accordance with one embodiment of the present invention. The computing system generally includes an input device 40 operatively connected to a computing device 42. By way of example, the input device 40 may generally correspond to the input device 30 shown in FIGS. 9 and 10, and the computing device 42 may correspond to a laptop computer, desktop computer, PDA, media player, mobile phone, smart phone, video game or the like. As shown, input device 40 includes a depressible track pad 44 and one or more movement indicators 46. Track pad 44 is configured to generate tracking signals and movement indicator 46 is configured to generate a button signal when the track pad 44 is depressed. Although track pad 44 may be widely varied, in this embodiment, track pad 44 includes capacitance sensors 48 and a control system 50 for acquiring the position signals from sensors 48 and supplying the signals to computing device 42. Control system 50 may include an application specific integrated circuit (ASIC) that is configured to monitor the signals from sensors 48, to compute the location (Cartesian or angular), direction, speed and acceleration of the monitored signals and to report this information to a processor of computing device 42. Movement indicator 46 may also be widely varied. In this embodiment, however, movement indicator 46 takes the form of a switch that generates a button signal when track pad 44 is depressed. Switch 46 may correspond to a mechanical, electrical or optical style switch. In one particular implementation, switch 46 is a mechanical style switch that includes a protruding actuator 52 that may be pushed by track pad 44 to generate the button signal. By way of example, the switch may be a tact switch or tactile dome.

Both track pad 44 and switch 46 are operatively coupled to computing device 42 through a communication interface 54. The communication interface provides a connection point for direct or indirect connection between the input device and the electronic device. Communication interface 54 may be wired (wires, cables, connectors) or wireless (e.g., transmitter/receiver).

Computing device 42 generally includes a processor 55 (e.g., CPU or microprocessor) configured to execute instructions and to carry out operations associated with the computing device 42. For example, using instructions retrieved for example from memory, the processor may control the reception and manipulation of input and output data between components of the computing device 42. In most cases, processor 55 executes instruction under the control of an operating system or other software. Processor 55 can be a single-chip processor or can be implemented with multiple components.

Computing device 42 also includes an input/output (I/O) controller 56 that is operatively coupled to processor 54. I/O controller 56 may be integrated with processor 54 or it may be a separate component, as shown. I/O controller 56 is generally configured to control interactions with one or more I/O devices that can be coupled to computing device 42, for example, input device 40. I/O controller 56 generally operates by exchanging data between computing device 42 and I/O devices that desire to communicate with computing device 42.

Computing device 42 also includes a display controller 58 that is operatively coupled to processor 54. Display controller 58 may be integrated with processor 54 or it may be a separate component, as shown. Display controller 58 is configured to process display commands to produce text and graphics on a display screen 60. By way of example, display screen 60 may be a monochrome display, color graphics adapter (CGA) display, enhanced graphics adapter (EGA) display, variable-graphics-array (VGA) display, super VGA display, liquid crystal display (LCD) (e.g., active matrix, passive matrix and the like), cathode ray tube (CRT), plasma displays, backlit light-emitting diode (LED) LCD displays, or the like.

In one embodiment (not shown), track pad 44 can comprise a glass surface functioning not only as a touch-sensitive surface, but also as a display screen; in this case display screen 60 shown in FIG. 11 would be integrated with the glass surface of the track pad 44. This could be useful in computing devices (e.g., media players or mobile phones) having touch sensitive displays. An example of a media player having a touch sensitive display is the iPod Touch produced by Apple Inc. of Cupertino Calif. An example of a mobile phone having a touch sensitive display is the iPhone produced by Apple Inc. of Cupertino Calif.

In most cases, processor 54 together with an operating system operates to execute computer code and produce and use data. The computer code and data may reside within a program storage area 62 that is operatively coupled to processor 54. Program storage area 62 generally provides a place to hold data that is being used by computing device 42. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 62 is configured to store information for controlling how the tracking and button signals generated by input device 40 are used by computing device 42.

Figure 12:
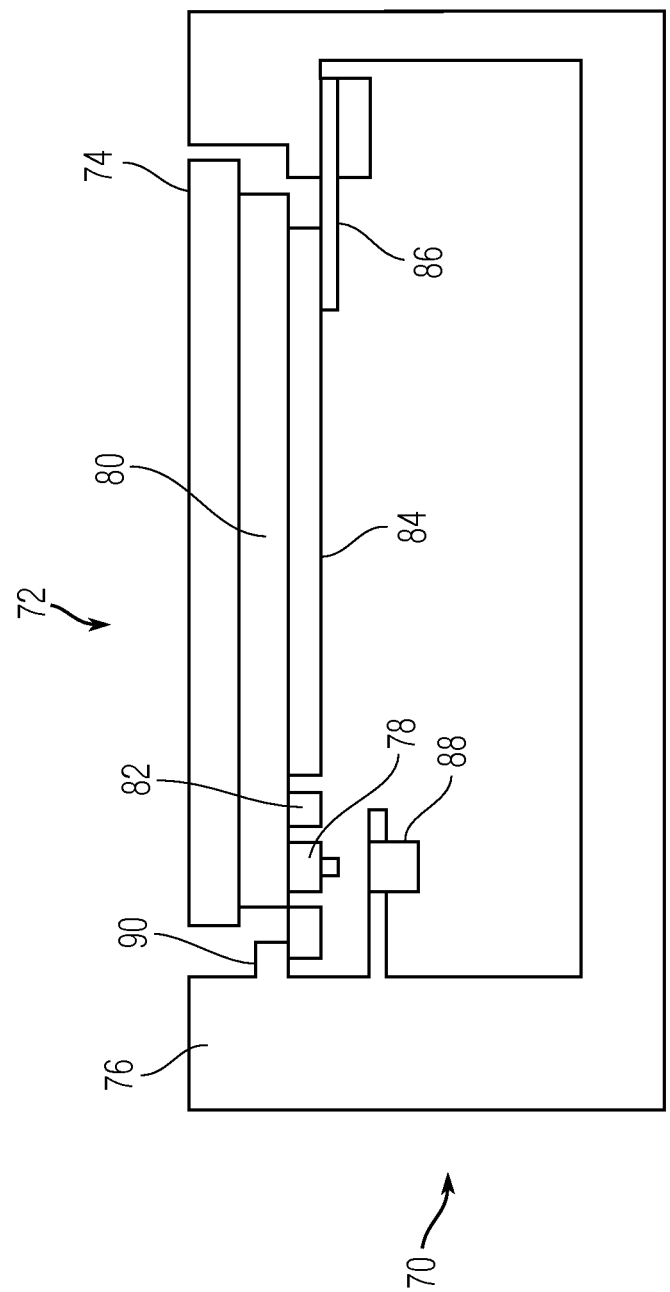
FIG. 12 is a side view, in cross section, of an exemplary input device, in accordance with one embodiment of the invention.
Figure 13:
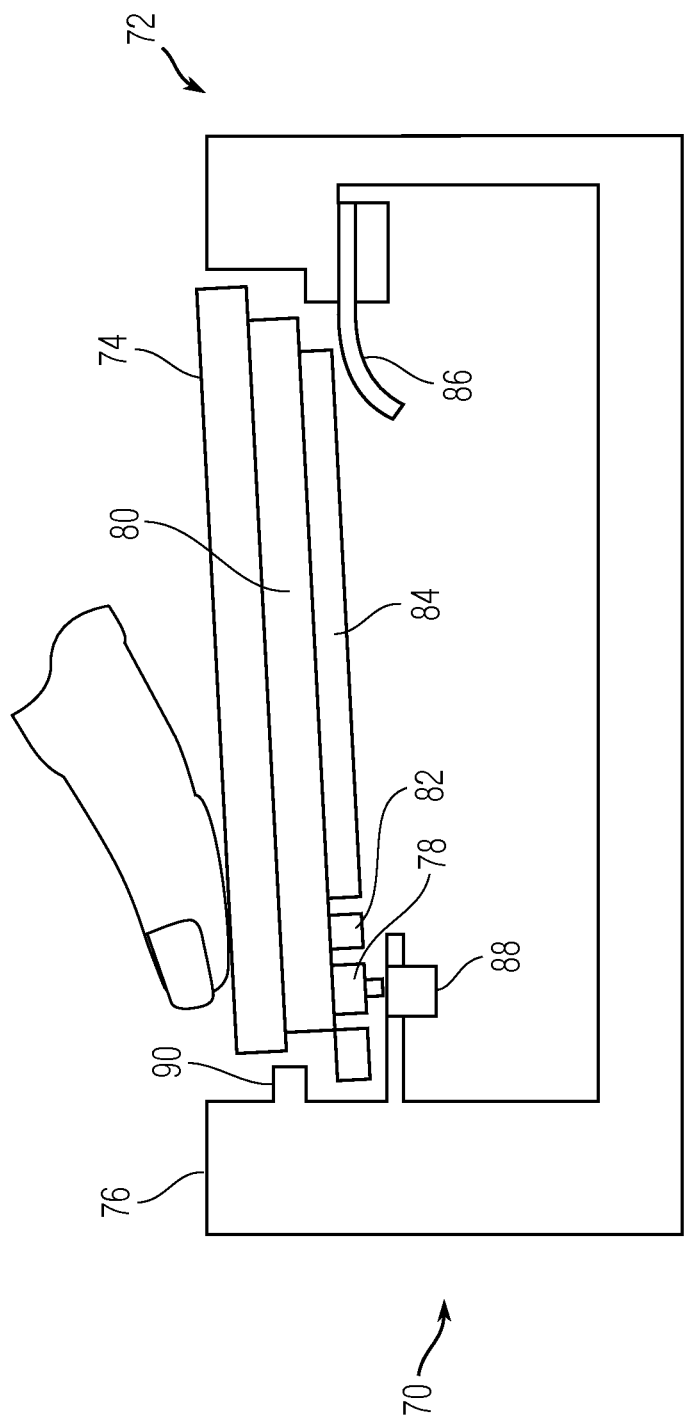
FIG. 13 is another side view, in cross section, of the exemplary input device of FIG. 12.

FIG. 12 shows one embodiment of an input device, generally shown at 70, comprising a track pad 72 connected to a frame 76. Frame 76 may be a housing for a stand alone input device, or it may be a casing for another device which incorporates track pad 72, for example a laptop computer, desktop computer, hand held media device, PDA, mobile phone, smart phone, etc. Track pad 72 includes various layers including an outer touch-sensitive track surface 74 for tracking finger movements. Track surface 74 may also provide a low friction cosmetic surface. In one embodiment, track pad 72 is based on capacitive sensing; therefore, it includes an electrode layer 80, which, for example, may be implemented on a PCB. In the case of capacitive sensing, track surface 74 is a dielectric material. A stiffener 84 is located below electrode layer 80. Stiffener 84 is shown in FIG. 12 and FIG. 13, but in some embodiments may be omitted. Stiffener 84 may be used to compensate for the inherent flexibility of electrode layer 80. Electrode layer 80 responds to finger movements along to track surface 74 by sending signals to sensor 82. In the case of capacitive sensing, electrode layer 80 registers changes in capacitance based on finger movements and sensor 82 is a capacitive sensor. In this way, track pad 72 incorporates a touch sensor arrangement. Sensor 82 is shown disposed on the bottom of electrode layer 80, but it may be located elsewhere in other embodiments. If, as in the illustrated embodiment, sensor 82 is located on a movable part of track pad 72, the input device may incorporate a flexible electrical connection (not shown) capable of moving with the system.

A movement indicator 78 is disposed on the bottom of track pad 72. Movement indicator 78 may be widely varied, however, in this embodiment it takes the form of a mechanical switch, which is typically disposed between the track pad 72 and the frame 76. In other embodiments, movement indicator 78 may be a sensor, for example an electrical sensor. Movement indicator 78 may be attached to frame 76 or to track pad 72. In the illustrated embodiment, movement indicator 78 is attached to the bottom side of electrode layer 80. By way of example, if electrode layer 80 is located on a PCB, movement indicator 78 may be located on the bottom of the PCB. In another example, movement indicator 78 may tack the form of a tact switches and more particularly, may be an SMT dome switches (dome switch packaged for SMT).

Track pad 72 is shown in its neutral position in FIG. 12, where movement sensor 78 is not in contact with frame 76. When a user applies a downward pressure to track surface 74, track pad 72 may move downward causing movement sensor 78 to register this change in position. In the illustrated embodiment, movement sensor 78 (a tact switch) would contact either frame 76, or in this case set screw 88. Set screw 88 may be manually adjusted to alter the distance between the neutral and activate positions. In one embodiment (not shown), set screw 88 may directly abut movement sensor 78 in the neutral position, such that there is no slack or pre-travel in the system. A flexure hinge 86 connects track pad 72 with frame 76. Flexure hinge 86 is a resilient material that flexes when a force is applied, but exerts a restoring force so as to urge track pad 72 back towards the neutral position. In one embodiment, flexure hinge 86 may be thin spring steel.

As shown in FIG. 13, flexure hinge 86 will flex when a user pushes down on track surface 74. Flexure 86 also urges track pad 72 towards its neutral position, which in the illustrated embodiment shown in FIG. 12 is horizontal. In this way, a user can press down virtually anywhere on track surface 74 and cause a "pick," meaning that movement indicator 78 will register this depression. This is in contrast to prior track pads which incorporate separate track zones and pick zones. Being able to pick anywhere on track surface 74 will provide the user with a more intuitive and pleasurable interface. For example, a user may be able to generate tracking and button signals with a single finger without ever having to remove the finger from track surface 74. In contrast, a user operating a track pad with separate track and pick zones may, for example, use a right hand for tracking and a left hand for picking, or a forefinger for tracking and thumb picking.

A shoulder 90, which may be an extension of frame 76 or a discreet member, blocks track pad 72 from traveling past its neutral position by contacting a part of track pad 72, for example stiffener 84. In this way, track surface 74 may be kept substantially flush with a top surface of frame 76. There may be a shock absorber or upstop (not shown) incorporated in conjunction with shoulder 90 to cushion contacts between track pad 72 and shoulder 90.

As should be appreciated, the pick generated by pressing on track surface 74 may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like.

Flexure hinge 86 allows for a movable track pad in the minimum vertical space possible. Minimum vertical space is achieved because flexure hinge 86 is thin and is generally situated parallel to a bottom layer of track pad 72, consequently, flexure hinge 86 does not appreciably add to the thickness of track pad 72. Therefore, this arrangement is feasible for use in ultra-thin laptop computers. In such ultra-thin laptop computer applications, vertical space is extremely limited. In the past, the size of electrical components was often the limiting feature as to how small electrical devices could be made. Today, electrical components are increasingly miniaturized, meaning that mechanical components (e.g., movable track pads) may now be the critical size-limiting components. With this understanding, it is easy to appreciate why linear-actuation (e.g., supporting a movable track pad by coil springs or the like) is not ideal in some applications. Furthermore, using springs may add unnecessary complexity (increased part count, higher cost, higher failure rates, etc. . . . ) to the manufacturing process. Another disadvantage of springs is that in some embodiments springs may mask or compromise the tactile switch force profile. In contrast, flexure 86 can deliver a substantially consistent feel across the track surface 74, and give the user a more faithful representation of the tactile switch force profile.

Referring now to FIG. 13, according to one embodiment of the present invention, when a user presses on track surface 74 of track pad 72, track pad 72 pivots downwardly activates switch 78 disposed underneath. When activated, switch 78 generates button signals that may be used by an electronic device connected to input device 70. Flexure 86 can constrain track pad 72 to move substantially about only one axis. This can be accomplished by, for example, using multiple flexures arranged along an axis on one side of track pad 72, such as the rear side. Furthermore, if track pad 72 is made stiff (for example, by inclusion of stiffener 84 if necessary), a leveling architecture is achieved. In other words, flexure hinge 86 urges track pad 72 towards its neutral position and also permits movement about substantially only one axis, i.e., the axis along which flexure hinge 86 is connected to frame 76.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A device comprising:
   a user interface device including
      a touch sensing panel configured to sense one or more touch inputs thereon, and
      a mechanical sensor configured to sense one or more pick inputs causing physical deformations or displacements of the touch sensing panel; and
   a modification module configured to
      receive user input data defining sensed touch and pick inputs from the user interface device, and
      modify the user input data to remove or reduce an effect at least one of the sensed touch or pick inputs in response to a touch pattern formed by the one or more sensed touch or pick inputs,
   wherein the touch sensing panel is configured to sense one or more touch inputs independently of the mechanical sensor.

2. The device of claim 1, wherein the modification module is configured to perform no modification of a pick input when the pick input is entered simultaneously with a plurality of finger touch inputs and no other touch inputs are received.

3. The device of claim 1, wherein the modification module is configured to reject a pick input when the pick input is entered simultaneously with a plurality of finger touch inputs, the number of finger touch inputs being higher than a predefined number.

4. The device of claim 1, wherein the modification module is configured to perform no modification of a pick input when the pick input is entered simultaneously with a finger touch input at an edge of the touch panel.

5. The device of claim 1, wherein the modification module is configured to reject a pick input when the pick input is entered simultaneously with one or more palm touch inputs positioned close to the sides of the touch panel.

6. The device of claim 1, wherein the modification module is configured to reject a pick input when the pick input is entered simultaneously with a palm touch input positioned close to side of the touch panel and a finger touch input positioned at the top of the touch panel.

7. The device of claim 1, wherein the modification module is configured to perform no modification of a pick input when the pick input is entered simultaneously with a palm touch input positioned close to side of the touch panel and a finger touch input not positioned at the top of the touch panel.

8. The device of claim 1, wherein the modification module is configured to reject a pick input when the pick input is entered simultaneously with a palm touch input positioned close to side of the touch panel and a finger touch input positioned at the top of the touch panel.

9. The device of claim 1, wherein the modification module is configured to reject a pick input when the pick input is entered while touch inputs which are recognized by the modification module to be part of an ongoing gesture are being entered.

10. The device of claim 1, wherein the modification module receives input data indicating a first finger touch input that is initially positioned in a lower portion of the touch panel and subsequently moves out of the lower portion, and a second finger touch input that moves while the first finger touch input is moving out of the lower portion, the modification module being configured to reject the first finger touch input if the second finger touch input moves a distance longer than a predefined distance.

11. The device of claim 1, wherein the modification module receives input data indicating a first finger touch input that is moving and a second finger touch input that is detected while the first finger touch input is moving, the modification module being configured to reject the first finger touch input when the second finger touch input appears, if the second finger touch input appears after the first finger touch input has been moving for at least a predefined period of time.

12. The device of claim 1, wherein the modification module receives input data indicating a plurality of finger touch inputs and a pick input, the modification module being configured to select a lowest path input from the plurality of finger touch inputs, and reject the lowest path input.

13. The device of claim 12, wherein the lowest path input is rejected at least while one or both of the following is true: (i) the pick input is ongoing, and (ii) the lowest path is not the only detected touch.

14. The device of claim 1, wherein the modification module receives input data indicating one or more finger touch inputs, at least one of said finger touch inputs having a non-zero velocity and a pick input, the modification module being configured to modify the velocities of all finger touch inputs having non-zero velocities for a non-zero period of time after the detection of the pick input.

15. The device of claim 1, wherein the modification module receives input data indicating one or more finger touch inputs, at least one of said finger touch inputs having a non-zero velocity, and a cessation of an ongoing pick input, the modification module being configured to modify the velocities of all finger touch inputs having non-zero velocities for a non-zero period of time after the cessation of the ongoing pick input.

16. A method for processing user interface inputs detected by a combination user interface device comprising a touch sensing panel and a mechanical sensor, the method including:
  detecting one or more touch inputs by the touch sensing panel independently of the mechanical sensor;
  detecting one or more pick inputs causing physical deformations or displacements of the touch sensing panel by the mechanical sensor;
  receiving user input data defining sensed touch and pick inputs from the user interface device; and
  modifying the user input data to remove or reduce an effect of ignore at least one of the sensed touch or pick inputs in response to a touch pattern formed by the one or more sensed touch or pick inputs.

17. The method of claim 16, further including:
  receiving user input data indicating a pick input entered simultaneously with a plurality of finger touch inputs and no other touch inputs; and
  performing no modification to the pick input.

18. The method of claim 16, further including:
  receiving user input data indicating a pick input entered simultaneously with a plurality of finger touch inputs, the number of finger touch inputs being higher than a predefined number; and
  rejecting the pick input.

19. The method of claim 16, further including:
  receiving user input data indicating a pick input entered simultaneously with a finger touch input at an edge of the touch sensing panel; and
  performing no modification to the pick input.

20. The method of claim 16, further including:
  receiving user input data indicating a pick input entered simultaneously with one or more palm touch inputs positioned close to the sides of the touch sensing panel; and
  rejecting the pick input.

21. The method of claim 16, further including:
  receiving user input data indicating a pick input entered simultaneously with a palm touch input positioned close to side of the touch sensing panel and a finger touch input positioned at the top of the touch sensing panel; and
  rejecting the pick input.

22. The method of claim 16, further including:
  receiving user input data indicating a pick input entered simultaneously with a palm touch input positioned close to side of the touch sensing panel and a finger touch input not positioned at the top of the touch sensing panel; and
  performing no modification to the pick input.

23. The method of claim 16, further including:
  receiving user input data indicating a pick input entered simultaneously with a palm touch input positioned close to side of the touch sensing panel and a finger touch input positioned at the top of the touch sensing panel; and
  rejecting the pick input.

24. The method of claim 16, further including:
  receiving user input data indicating a plurality of moving touch inputs;
  recognizing the plurality of moving touch inputs as part of an ongoing touch gesture;
  receiving user input data indicating a pick input being entered while the touch inputs recognized as part of an ongoing gesture are being entered; and
  rejecting the pick input.

25. The method of claim 16, further including:
  receiving input data indicating a first finger touch input that is initially positioned in a lower portion of the touch sensing panel and subsequently moves out of the lower portion, and a second finger touch input that moves while the first finger touch input is moving out of the lower portion;
  determining that the second finger touch input had moved a distance greater than a predefined distance before the first finger touch input exited the lower portion; and
  rejecting the first finger touch input.

26. The method of claim 16, further including:
  receiving input data indicating a first finger touch input that is moving and a second finger touch input that is detected while the first finger touch input is moving;
  determining that the second finger touch input appeared after the first finger touch input has been moving for a predefined period of time; and
  rejecting the first finger touch input.

27. The method of claim 16, further including
  receiving input data indicating one or more finger touch inputs, at least one of said finger touch inputs having a non-zero velocity and a pick input; and
  modifying the velocities of all finger touch inputs having non-zero velocities for a non-zero period of time after the detection of the pick input.

28. The method of claim 16, further including:
  receiving input data indicating one or more finger touch inputs, at least one of said finger touch inputs having a non-zero velocity and cessation of an ongoing pick input; and
  modifying the velocities of all finger touch inputs having non-zero velocities for a non-zero period of time after the cessation of the ongoing pick input.

29. A computer comprising:
  a user interface device including
    a touch sensing panel configured to sense one or more touch inputs thereon, and a mechanical sensor configured to sense one or more pick inputs causing physical deformations or displacements of the touch sensing panel; and a modification module configured to receive user input data defining sensed touch and pick inputs from the user interface device, and modify the user input data to remove or reduce an effect ignore at least one of the sensed touch or pick inputs in response to a touch pattern formed by the one or more sensed touch or pick inputs, wherein the touch sensing panel is configured to sense one or more touch inputs independently of the mechanical sensor.

30. A computer mouse comprising:

a user interface device including a touch sensing panel configured to sense one or more touch inputs thereon, and a mechanical sensor configured to sense one or more pick inputs causing physical deformations or displacements of the touch sensing panel; and a modification module configured to receive user input data defining sensed touch and pick inputs from the user interface device, and modify the user input data to remove or reduce an effect of ignore at least one of the sensed touch or pick inputs in response to a touch pattern formed by the one or more sensed touch or pick inputs, wherein the touch sensing panel is configured to sense one or more touch inputs independently of the mechanical sensor.

* * * * *